(12) United States Patent
Russ et al.

(10) Patent No.: US 6,748,080 B2
(45) Date of Patent: Jun. 8, 2004

(54) APPARATUS FOR ENTITLING REMOTE CLIENT DEVICES

(75) Inventors: Samuel H. Russ, Lawrenceville, GA (US); Michael A. Gaul, Lawrenceville, GA (US); Anthony J. Wasilewski, Alpharetta, GA (US); Howard G. Pinder, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 49 days.

(21) Appl. No.: 10/154,495

(22) Filed: May 24, 2002

(65) Prior Publication Data

US 2003/0219127 A1 Nov. 27, 2003

(51) Int. Cl.⁷ ................................................ H04N 7/167
(52) U.S. Cl. ...................................................... 380/239
(58) Field of Search .................................. 380/239, 210, 380/211, 232, 240; 725/31; 705/52

(56) References Cited

U.S. PATENT DOCUMENTS

| | | | | |
|---|---|---|---|---|
| 5,742,686 A | * | 4/1998 | Finley | 380/28 |
| 5,796,829 A | * | 8/1998 | Newby et al. | 705/54 |
| 5,872,846 A | * | 2/1999 | Ichikawa | 380/282 |
| 5,987,572 A | * | 11/1999 | Weidner et al. | 711/155 |
| 2002/0146237 A1 | | 10/2002 | Safadi | 386/94 |

* cited by examiner

*Primary Examiner*—Matthew Smithers

(57) ABSTRACT

A master-receiver in a subscriber television network receives service instances and entitlement information from a headend of the subscriber television network and re-transmits service instances to a client-receiver after dynamic encryption scheme determination.

73 Claims, 8 Drawing Sheets

APPARATUS FOR ENTITLING REMOTE CLIENT DEVICES

FIELD OF THE INVENTION

This invention relates generally to communications systems, such as subscriber television systems, among others, and more specifically to entitling devices in the communication systems.

BACKGROUND OF THE INVENTION

Frequently, broadband systems transmit television signals and programs to subscribers of a conditional access system, or a subscriber network system. Broadband systems, such as cable and satellite television systems, typically include a headend for receiving programming and/or data from various sources and redistributing the programming and other data through a distribution system to subscribers. The headend receives programming signals from a variety of sources, such as content providers or entitlement agents, and combines the signals from the various sources, and transmits the combined signals through the distribution system to subscriber equipment. The subscriber network system offers subscribers of the system with services such as, but not limited to, Internet service and telephone service and potentially hundreds of program selections or service instances. Service instances include, but are not limited to, an installment of an audio or visual or audio/visual program. A service instance can be broadcast to all of the subscribers of the conditional access system, a portion of the subscribers, or an individual subscriber. Service instances include regular programming, special programming such as pay-per-view, and subscriber requested services such as personal television.

At a subscriber location, a digital subscriber communications terminal (DSCT) is typically coupled to a coaxial outlet by a short coaxial cable and the coaxial outlet is coupled to the broadband distribution system. Today, there are many subscriber devices such as, but not limited to, smart appliances, laptop computers, personal digital assistants (PDAs), video cassette recorders (VCRs) and televisions that can receive service instances and other information from the subscriber network.

The DSCT and the subscriber devices are sometimes coupled together via a local area network, which can be wired or wireless or a combination thereof. Wired communication paths include, among others, HomePNA 1 and 2, which uses home telephone lines and which has a data transfer rate of up to 1 and 10 Mbps, respectively, HomePlug, which has a data transfer rate of 14 Mbps, and Ethernet. Wired communication has the disadvantage of requiring that a wire extend from the DSCT to the subscriber device, which in an existing subscriber residence may entail retrofitting the residence, and that can be expensive. Therefore, it is frequently desirable to couple subscriber devices to the DSCT using wireless communication, especially with the proliferation of portable computing devices. Wireless communication allows the subscriber to easily move his or her portable computing device, smart appliance, etc., or client-devices, within his or her local wireless network while remaining connected to the subscriber network through the subscriber's DSCT and also eliminating the need to wire multiple rooms with coaxial cable or other wires. Wireless technologies have advanced so that they enable data to be pumped quickly through a wireless connection. The Institute for Electronics and Electrical Engineers (IEEE) 802.11b standard enables the user to transfer data at a rate approximately equal to Ethernet data rates, about 10 Mbps. As such it is sometimes called wireless Ethernet. IEEE 802.11a enables transfer rates of up to 54 Mbps. Industry collaboration, Bluetooth 2.0 enables users to transfer data at a rate of about 10 Mbps. HomeRF 2.0 is another industry collaboration, backed by a few of the same companies promoting the Bluetooth standard, and like Bluetooth 2.0, has a maximum data transfer rate of about 10 Mbps.

However, local area networks introduce security and control concerns for the operators of the subscriber network system. Thus, there exists a need for a system that addresses these concerns.

DETAILED DESCRIPTION OF PREFERRED EMBODIMENTS

Figure 1:
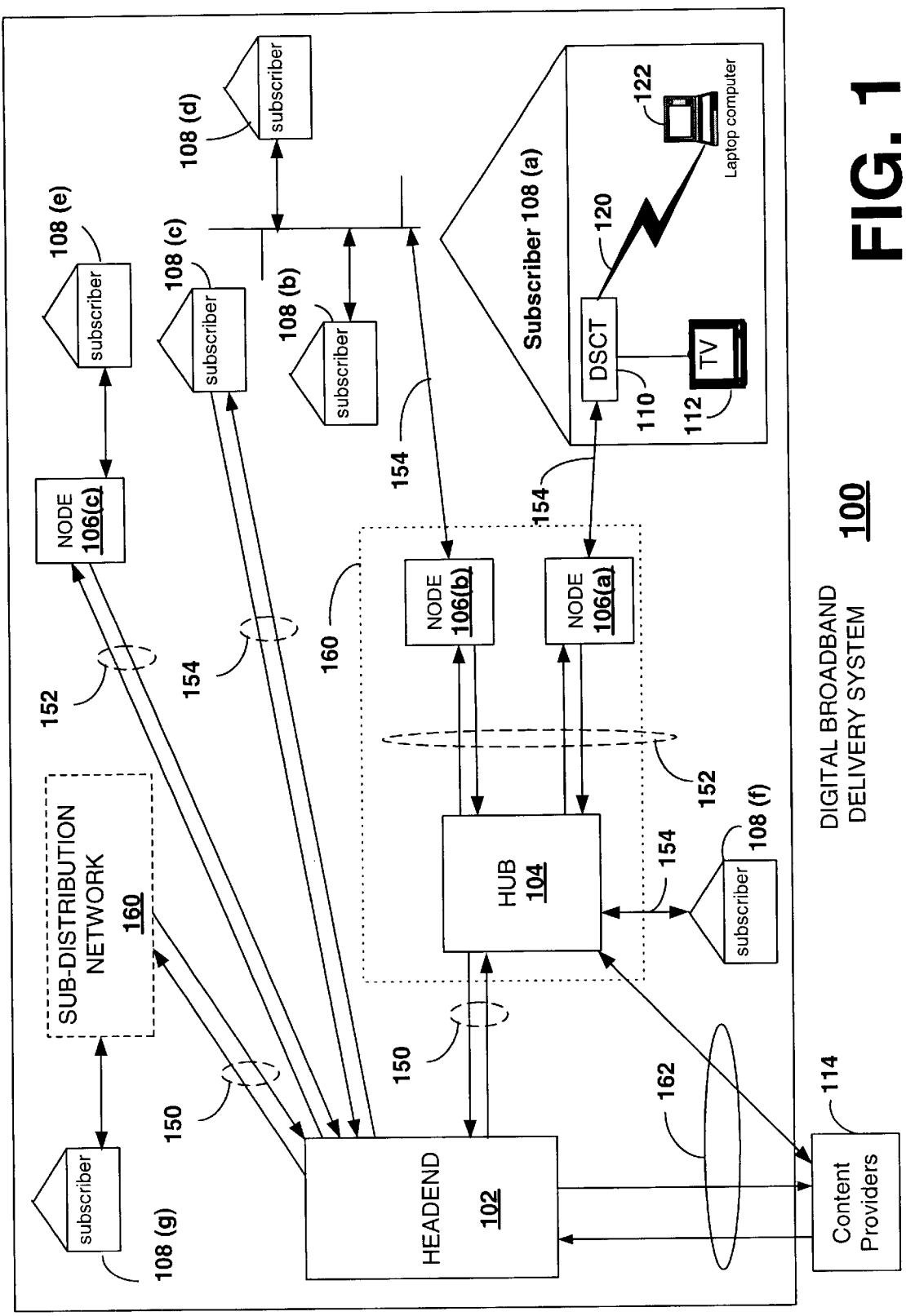
FIG. 1 is a block diagram of a broadband communications system, such as a cable television system, in which the preferred embodiment of the present invention may be employed.

Preferred embodiments of the present invention will be described more fully hereinafter with reference to the accompanying drawings in which like numerals represent like elements throughout the several figures, and in which an exemplary embodiment of the invention is shown. The present invention may, however, be embodied in many different forms and should not be construed as limited to the embodiments set forth herein. The examples set forth herein are non-limiting examples and are merely examples among other possible examples.

The operator of a subscriber network system desires the ability to entitle (or disentitle) subscriber devices, i.e., to enable (or prevent) the subscriber devices from accessing communication transmitted over a local area network, which may include wired communication links, wireless communication links, or a combination thereof. In addition, the operator wants to be able to securely communicate information from a DSCT to the subscriber devices, but wireless networks pose additional concerns for the operator. Because communication signals over wireless links are more readily intercepted than signals over wired links, wireless communication links are inherently less secure. Furthermore, the operator wants the capability to control the type of devices that receive information from the DSCT or the type of content that the device receives. For example, the operator may allow a personal computer to receive some information such as email but prevent the personal computers from receiving a program that is in a digital format. Thus, the operators desire an apparatus that can provide the client-devices with entitlements to access received service instances, establish secure communication with the client-devices, and control the content that is provided to the client-devices.

The preferred embodiments of the present invention are described in the context of a DSCT in a subscriber television network. However, it is to be understood that such a context is merely one example context among others. As will be described in greater detail hereinbelow, the subscriber television network includes a headend that receives content and transmits the content to the DSCT. At the subscriber location, a client-device is coupled to the DSCT, and the DSCT dynamically determines an encryption scheme for transmitting content to the client-receiver. The DSCT transmits content to the client-device via wired or wireless communication paths.

The logic of the preferred embodiment(s) of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present invention includes embodying the functionality of the preferred embodiments of the present invention in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, the process descriptions or blocks in flow charts should be understood as representing decisions made by a hardware structure such as a state machine known to those skilled in the art.

A description of a subscriber television system is provided hereinbelow. First an overview of a subscriber television system is given, then a description of the functionality and components of the headend is provided, and then a description of the functionality and components of a DSCT and a client-receiver at a subscriber location is given. Non-limiting embodiments of the present invention are described in the context of a DSCT located at the subscriber's location.

Subscriber Television System Overview

In this discussion, a two-way interactive digital subscriber television system or a digital subscriber network is also referred to as a Digital Broadband Delivery System (DBDS). An overview of an exemplary DBDS is provided in U.S. Pat. No. 6,157,719, entitled "Conditional Access System", which is hereby incorporated by reference herein in its entirety. A function of the DBDS is to: provide interfaces to content providers, service providers and entitlement agents; control access to and the use of the content and services; and to distribute the content and services to subscribers. For the purposes of this disclosure, an entitlement agent is an entity that provides the subscribers of the DBDS with entitlements for services and content associated with the entitlement agent. The content providers and services providers may not want to be in the business of managing entitlements for the subscribers of the DBDS. In that case, the content and services from the content and service providers are associated with the entitlement agent and the entitlement agent provides the subscribers with the entitlements for the associated content and services. In addition, services and content associated with an entitlement agent include services and content provided to the DBDS by the entitlement agent.

The subscriber network system offers subscribers of the system services such as, but not limited to, Internet service and telephone service and potentially hundreds of program selections or service instances. Service instances include, but are not limited to, an installment of an audio or visual or audio/visual program. A service instance can be broadcast to all of the subscribers of the conditional access system, a portion of the subscribers, or an individual subscriber. Service instances include regular programming, special programming such as pay-per-view, and subscriber requested services such as personal television.

The distribution system can include a variety of media, which can handle multiple in-band signals. Typically, in a subscriber system, such as a cable television system, the in-band signals are 6 MHz wide, which correspond to the bandwidth used to transmit a conventional analog television program. Today, many programs and service instances are transmitted in a digital format, such as, but not limited to, motion picture experts group (MPEG).

MPEG Programming

In a digital format, a program is encoded into its elementary parts, such as video, audio, etc. Frequently, a program can use more than one audio track so that the program can be heard in several different languages such as English, French, or German, and each audio track is an elementary stream of the program. The program is further encoded so that the elementary parts are packetized into multiple packets. MPEG is a common format used for packetizing a digital program. A packet identifier (PID) identifies each of the packets, and all of the packets that make up an elementary part of the program have the same PID values. For example, all of the video packets might have the PID value of 251 and, all of the English audio packets might have a PID value of 255, etc.

In a conventional analog system, only one analog program is transmitted through a 6 MHz wide pipe, but a 6 MHz wide pipe can carry a transport stream that includes several multiplexed digital programs. The packets of a digital program are transmitted in a transport stream, which is a continuous stream of packets. Generally, the transport stream is made up of multiple programs or service instances that are multiplexed together. The transport stream is made up of elementary streams or PID streams, which are streams of packets having the same PID values. Each PID stream of the transport stream has a unique value, so that a given PID stream is part of only one program. The packets of a program are transmitted in a synchronized manner, such that the packets of the program are received at the appropriate time so that the video and audio are synchronized when the program is viewed. For the purposes of this disclosure, a digital transport stream is described in terms of an MPEG transport stream, but this is for exemplary purposes only.

In an MPEG transport stream, the PID values range from 0 to 8,191. Certain PID values such as zero and 8,191 are reserved and are assigned to packets having specific information or functions. For example, stuffing packets, which are assigned the PID value of 8,191, are filler packets that are inserted into the transport stream when there are no other packets available for transmission. Program association tables (PATs) are assigned the PID value of zero, and are used to map programs to their program map tables (PMTs). (Each program of a transport stream has a unique program number.) For example, a program such as "The Dirty Dozen" can have the program number of 15, and in that case, the PAT maps program number 15 to a PMT, such as PMT 256. The PMT 256 is the packet of the transport stream that has the PID value 256, and PMT 256 maps the elementary streams of program 15 to their PID streams. For example, PMT 256 maps the video stream of "The Dirty Dozen" to PID stream 262, and English audio stream to PID stream 263.

MPEG as referenced in this application is described in the MPEG-1, MPEG-2 and MPEG-4 standards. The MPEG-1 standards (ISO/IEC 11172), the MPEG-2 standards (ISO/IEC 13818) and the MPEG-4 standards (ISO/IEC 14496) are described in detail in the International Organization for Standardization document ISO/IEC JTC1/SC29/WG11 N (June 1996 for MPEG-1, July 1996 for MPEG-2, and October 1998 for MPEG-4), which is hereby incorporated by reference.

Subscriber Television Network

Referring to FIG. 1, a digital broadband distribution system (DBDS) 100 includes, in one example among others, a headend 102, a plurality of hubs 104, multiple nodes 106, a plurality of subscriber locations 108, and a plurality of digital subscriber communication terminals (DSCTs) 110. The headend 102 provides the interface between the DBDS 100 and content and service providers 114, or entitlement agents, such as broadcasters, internet service providers, and the like via communication link 162. The transmission medium 162 between the headend 102 and the content and service providers 114 can be two-way. This allows for two-way interactive services such as Internet access via DBDS 100, video-on-demand, interactive program guides, etc. In the preferred embodiment, the hubs 104 are also in direct two-way communication with the content and service providers 114 via communication link 162 for providing two-way interactive services.

In the preferred embodiment, the headend 102 is in direct communication with the hubs 104 via communication link 150. In addition, the headend 102 is in direct communication with the nodes 106 via communication link 152 and in direct communication with the subscriber locations 108 via communication link 154. Whether or not the headend 102 is in direct communication with subscriber locations 108 is a matter of implementation. In an alternative embodiment, the headend 102 is in direct communication with hubs 104 and nodes 106 and in direct communication with subscriber locations 108.

The hub 104 receives programming and other information, which is typically in a protocol such as ATM or Ethernet, from headend 102 via transmission medium 150. The hub 104 transmits information and programming via transmission medium 152 to nodes 106, which then transmit the information to subscriber locations 108 through transmission medium 154. Whether the hub 104 communicates directly to subscriber locations 108 or to nodes 106 is matter of implementation, and in the preferred embodiment, the hub 104 is also adapted to transmit information and programming directly to subscriber locations 108 via transmission medium 154.

In the preferred embodiment, the transmission medium 150 and 152 are optical fibers that allow the distribution of high quality and high-speed signals, and the transmission medium 154 is either broadband coaxial cable or optical fiber. When the communication path from the headend 102 to the DSCT 110 includes a combination of coaxial cable and optical cable, the communication path is frequently referred to as a hybrid fiber coax (HFC) communication path. In alternative embodiments, the transmission media 150, 152 and 154 can include one or more of a variety of media, such as optical fiber, coaxial cable, satellite, direct broadcast, terrestrial digital, Multichannel Multipoint Distribution System (MMDS) or other transmission media known to those skilled in the art. Typically, the transmission media 150, 152 and 154 are two-way communication media through which both in-band and out-of-band information are transmitted. Through the transmission media 150, 152, and 154 subscriber locations 108 are in direct or indirect two-way communication with the headend 102 and/or the hub 104. Typically, when the DSCT 110 is in satellite communication with the headend 102, the communication path is one-way from the headend 102 to the DSCT 110. However, in an alternative embodiment, the DSCT 110 and the headend 102 are in two-way communication via a telephone network (not shown).

The hub 104 functions as a mini-headend for the introduction of programming and services to sub-distribution network 160. The sub-distribution network 160 includes hub 104 and the plurality of nodes 106 connected to hub 104. Having a plurality of hubs 104 that function as mini-headends facilitates the introduction of different programming, data and services to different sub-distribution networks of DBDS 100. For example, the subscriber location 108(*b*), which is connected to node 106(*b*), can have different services, data and programming available than the services, data and programming available to subscriber location 108(*c*), which is connected directly to headend 102, even though the subscriber locations 108(*b*) and 108(*c*) may be in close physical proximity to each other. Services, data and programming for subscriber location 108(*b*) are routed through hub 104 and node 106(*b*); and hub 104 can introduce services, data and programming into the DBDS 100 that are not available through the headend 102.

At the subscriber locations 108 a decoder or a DSCT 110 provides the two-way interface between the DBDS 100 and the subscriber. The DSCT 110 decodes and further process the signals for display on a display device, such as a television set (TV) 112 or a computer monitor, among other examples. Those skilled in the art will appreciate that in alternative embodiments the equipment for first decoding and further processing the signal can be located in a variety of equipment, including, but not limited to, a DSCT, a computer, a TV, a monitor, or an MPEG decoder, among others.

Secure communication between the headend 102 and the DSCTs 110 is preferably accomplished using pairs of asymmetrical keys known to those skilled in the art, such as Rivest, Shamir, & Adleman (RSA) public key encryption technology. Briefly described, an asymmetrical key pair includes a public key, which is distributed to the public, and a private key, which is not distributed. Content that is encrypted with a public key can only be decrypted using the corresponding private key. A message that is signed with a private key is authenticated with the corresponding public key. The headend 102 and the DSCT 110 can securely communicate after they have exchanged public keys.

The headend 102 includes a database (not shown) that has the public key of each DSCT 110 in the DBDS 100. The headend 102 can securely communicate with a particular DSCT 110 by encrypting the content of a message using the public key of the particular DSCT 110. Only the particular DSCT 110 that has the corresponding private key can decrypt the content of the message. The private key of the headend 102 can also sign the message, and in that case the DSCT 110 uses the public key of the headend 102 to authenticate the message. For details regarding cryptography that a reasonably skilled person would understand see, Bruce Schneier, "Applied Cryptography", John Wiley & Sons, 1994. The DSCT 110 can also communicate with the headend 102 using public key-private key cryptography.

In the preferred embodiment, when the DSCT 110 is manufactured it is assigned a serial number, and it is provided with its own private key-public key pair and with a public key of an access controlling authority. The keys are provided to the DSCT 110 in a secure manner and stored in a protected memory in the DSCT 110. The manufacturer of the DSCT maintains a database that includes the public keys and the serial numbers of each of the DSCTs 110 that the manufacturer produces. Each DSCT 110 in the DBDS 100 has a unique serial number, and the serial number, which can be the MAC address of the DSCT 110, is used for addressing messages to the DSCT 110. The manufacturer provides a copy of the public key and the serial number of each DSCT 110 in the DBDS 100 to the operator of the DBDS 100. In that case, the manufacturer is a key certification authority that certifies to the operator of the DBDS 100 that a given public key belongs to a specific DSCT 110. The operator of the DBDS 100 maintains its database of public keys and serial numbers of each DSCT 110 in the DBDS 100.

In the preferred embodiment, the DSCT 110 is provided with multiple public keys during its manufacture. Because these keys were given to the DSCT 110 during its manufacture in a secure fashion, the DSCT 110 implicitly trusts these keys. The DSCT 110 trusts any message that is signed by a private key corresponding to one of these trusted public keys. At least one of the trusted public keys can be replaced by a different public key, which then becomes a trusted public key. To replace a trusted key the DSCT 110 receives at least two messages with a new trusted public key included therein. A private key corresponding to one of the trusted public keys that are not being replaced signs each of the messages. The DSCT 110 uses its trusted public keys to verify that the messages were signed by one of the corresponding private keys. The DSCT 110 only replaces one of its trusted public keys when the message is verified.

Before the DSCT 110 receives and accesses service instances from the headend 102, the DSCT 110 is registered with the headend 102 and entitled to the service instances. When the DSCT 110 is connected to the DBDS 100, it sends a message, which includes the serial number of the DSCT 110, to the headend 102. The operator of the DBDS 100 compares the serial number of the DSCT 110 against its database and registers the DSCT 110 if the database includes the serial number of the DSCT 110. Generally, the operator of the DBDS 100 replaces one of the trusted public keys of the DSCT 110 with its own trusted public key. This is accomplished by having the manufacturer of the DSCT 110 digitally sign two messages, which include the new trusted public key, for the DSCT 110 and then sending the two messages to the DSCT 110.

In one preferred embodiment, the operator of the DBDS 100 acts as the access controlling authority that controls access to the subscriber network. In another embodiment, among others, the manufacturer of the DSCT 110 acts as the access controlling authority. There is conditional access authority (CAA) logic implemented in the headend 102 that the access controlling authority uses for controlling access to the DBDS 100. The conditional access authority sends the DSCT 110 a secure message such as an entitlement management message (EMM), which is digitally signed by a private key of the conditional access authority. For the purposes of this disclosure, a secure message includes, as a non-limiting example, a message that has been digitally signed by the sender so that the recipient can verify the source of the message and verify that the content of the received message was not tampered with nor corrupted in transmission. The content of a secure message may be encrypted when the sender wants to make the content private or the content can be transmitted without encryption.

In the preferred embodiment, the private key of the conditional access authority corresponds to one of the trusted public keys of the DSCT 110. The DSCT 110 authenticates the EMM using the trusted public key of the conditional access authority and acts upon the EMM only if the EMM is authenticated as having come from the conditional access authority. Among other things, the conditional access authority uses EMMs to instruct the DSCT 110 to allocate a portion of its memory for entitlement information related to a service instance provided by an entitlement agent and to provide the DSCT 110 with the public key for an entitlement agent. The memory of the DSCT 110 is partitionable so that it can contain entitlement information for service instances from multiple entitlement agents and public keys from each of those entitlement agents.

The DSCT 110 is preferably in communication with client-receiver 122 via communication link 120. In the preferred embodiment, the communication link 120 is wireless such as, but not limited to, Institute for Electronics and Electrical Engineers (IEEE) standards 802.11a, 802.11b, 802.11g, HiperLAN/2, HomeRF 2, Bluetooth 2, and 802.15.3. In alternative embodiments, the DSCT 110 is in communication with multiple client-receivers via one or more communication links, such as, but not limited to, twisted-wire or Ethernet, telephone line, electrical power line and coaxial cable.

The client-receiver 122 is in two-way communication with the DSCT 110 and receives information and service instances therefrom. In one embodiment, the DSCT 110 acts as a proxy for the client-receiver 122, and in that case, the headend 102 transmits service instances and messages to the DSCT 110, which then processes the service instances before re-transmitting them to the client-receiver 122. In this embodiment, the headend 102 may or may not be aware of the client-receiver 122. Because the DSCT 110 proxies for the client-receiver 122, the headend 102 need only communicate with the DSCT 110. In another embodiment, the client-receiver 122 is acknowledged by the headend 102, and the headend 102 communicates with the client-receiver 122 through the DSCT 110. The DSCT 110 still processes messages communicated between the headend 102 and the client-receiver 122, but in this embodiment, the DSCT 110 acts as a facilitator, not as a proxy, for the client-receiver 122. For example, in one embodiment, the DSCT 110 authenticates and when necessary decrypts messages from the headend 102 that are addressed to the client-receiver 122. In another embodiment, the DSCT 110 is a gateway for the client-receiver 122 and merely passes communication between the client-receiver 122 and the headend 102. In yet another embodiment, the DSCT 110 decrypts messages and other information from the headend 102 and re-encrypts them for the client-receiver 122.

In the preferred embodiment, the local network at the subscriber location 108 is self-aware. When a new client-receiver 122 is brought into the local network, the client-receiver 122 discovers the network and communicates with the DSCT 110. In one embodiment, the client-receiver 122 and the DSCT 110 communicate via a standard such as Open Server Gateway interface (OSGi). Other non-limiting embodiments include communicating via Universal Plug and Play (UPnP), Home Audio Video Interoperability (HAVi) and Jini. The choice of a communication protocol is a matter of implementation and factors for choosing the communication protocol include the type of communication link coupling the DSCT 110 to the client-receiver 122 and the type of client-receiver 122. The client-receiver 122 can be any smart appliance including, but not limited to, a laptop computer, a computer, a personal digital assistant (PDA), VCR, another DSCT 110, or television, or the like, adapted to receive information or a service instance from the subscriber network system.

Headend

Figure 2:
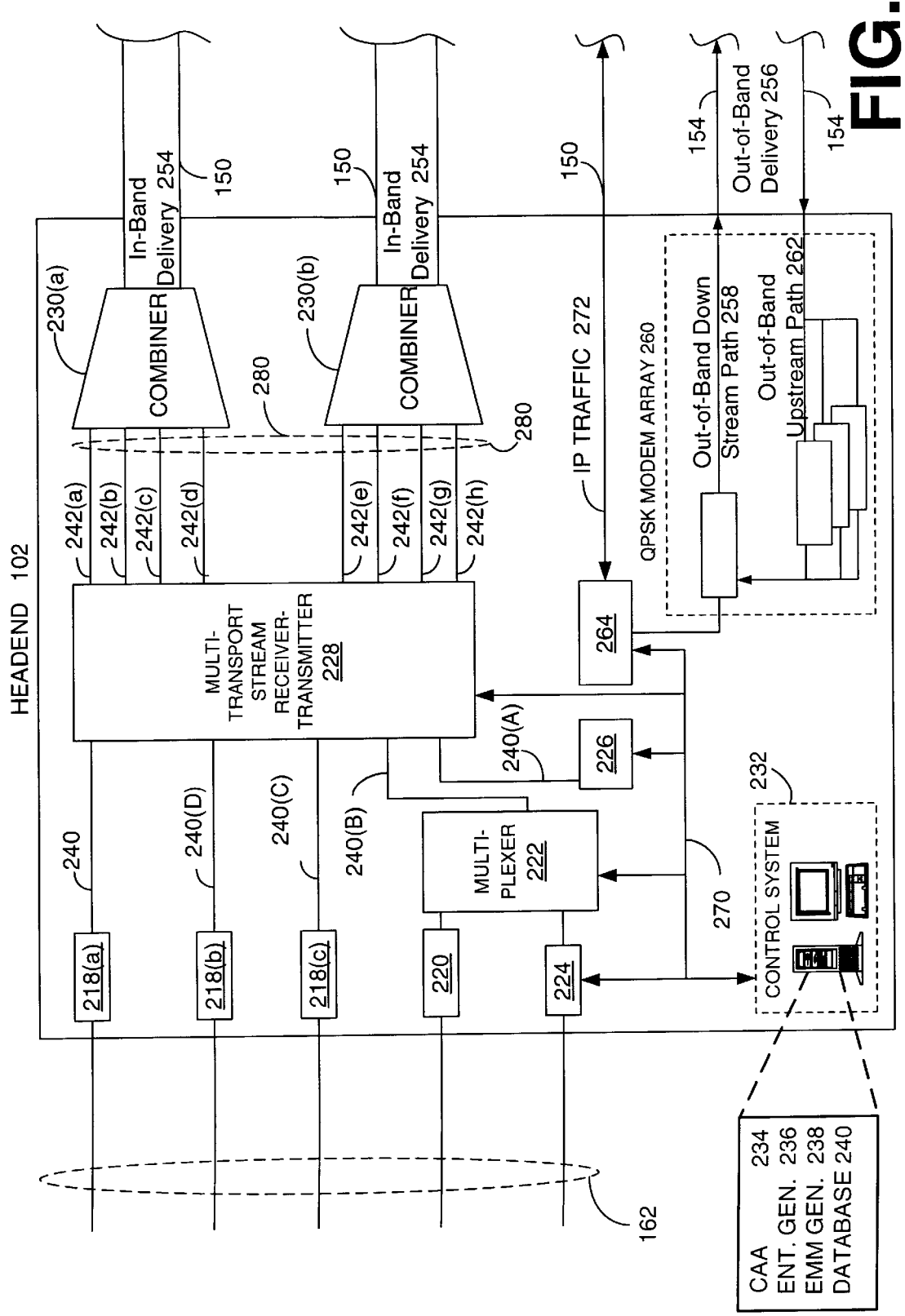
FIG. 2 is a block diagram of a headend in the broadband communication system in which the preferred embodiment of the present invention may be employed.

Referring to FIG. 2, in a typical system of the preferred embodiment of the invention, the headend 102 receives content from a variety of input sources, which can include, but are not limited to, a direct feed source (not shown), a video camera (not shown), an application server (not shown), and other input sources (not shown). The input signals are transmitted from the content providers 114 to the headend 102 via a variety of communication links 162, which include, but are not limited to, satellites (not shown), terrestrial broadcast transmitters (not shown) and antennas (not shown), and direct lines (not shown). The signals provided by the content providers, or entitlement agents, can include a single program or a multiplex of programs.

The headend 102 generally includes a plurality of receivers 218 that are each associated with a content source. Generally, the content is transmitted from the receivers 218 in the form of transport stream 240. MPEG encoders, such as encoder 220, are included for digitally encoding content such as local programming or a feed from a video camera. Typically, the encoder 220 produces a variable bit rate transport stream. Prior to being modulated, some of the signals may require additional processing, such as signal multiplexing, which is preformed by multiplexer 222.

A switch, such as asynchronous transfer mode (ATM) switch 224, provides an interface to an application server (not shown). There can be multiple application servers providing a variety of services such as, among others, a data service, an Internet service, a network system, or a telephone system. Service and content providers 114 (shown in FIG. 1) may download content to an application server located within the DBDS 100 or in communication with DBDS 100. The application server may be located within headend 102 or elsewhere within DBDS 100, such as in a hub 104.

Typically, the headend 102 includes a server such as a video-on-demand (VOD) pump 226. VOD pump 226 provides video and audio programming such as VOD pay-per-view programming to subscribers of the DBDS 100. Usually, the content from VOD pump 226 is provided in the form of the transport stream 240.

The various inputs into the headend 102 are then combined with the other information, which is specific to the DBDS 100, such as local programming and control information. The headend 102 includes a multi-transport stream receiver-transmitter 228, which receives the plurality of transport streams 240 and transmits a plurality of transport streams 242. In the preferred embodiment, the multi-transport stream receiver-transmitter 228 includes a plurality of modulators, such as, but not limited to, Quadrature Amplitude Modulation (QAM) modulators, that convert the received transport streams 240 into modulated output signals suitable for transmission over transmission medium 280.

In the preferred embodiment, the output transport streams 242 have a bandwidth of 6 MHz centered upon a frequency that is predetermined for each transport stream 242. The frequency for a given transport stream 242 is chosen such that the given transport stream will not be combined with another transport stream at the same frequency. In other words, only transport streams that are modulated at different frequencies can be combined, and therefore, the frequencies of transport streams 242A–D must be different from each other because combiner 230A combines them. The transport streams 242 from the multi-transport stream receiver-transmitters 228 are combined, using equipment such as combiner 230, for input into the transmission medium 150, and the combined signals are sent via the in-band delivery path 254 to subscriber locations 108.

A system controller, such as control system 232, which preferably includes computer hardware and software providing the functions discussed herein, allows the DBDS system operator to control and monitor the functions and performance of the DBDS 100. The control system 232 interfaces with various components, via communication link 270, in order to monitor and/or control a variety of functions, including the channel lineup of the programming for the DBDS 100, billing for each subscriber, and conditional access for the content distributed to subscribers. Control system 232 provides input to the multi-transport stream receiver-transmitter 228 for setting its operating parameters, such as system specific MPEG table packet organization or conditional access information among other things.

The control system 232 includes database 240 and logic for conditional access authority (CAA) 234, entitlement generator 236 and EMM generator 238. Database 240 includes, among other things, the serial numbers and public keys of the DSCTs 110 of DBDS 100. The EMM generator 238 uses database 240 to generate individually addressable EMM templates. The EMM generator 238 can also generate EMM templates for multiple DSCTs 110 and/or global EMM templates.

The CAA 234 is used by the access controlling authority to enable DSCTs 110 to receive entitlements for service instances. The CAA 234 receives EMM templates from the EMM generator 238 and uses the EMM template to create an EMM. To create an EMM, the CAA 234 includes a message content and an authentication token in the EMM template. The CAA 234 determines whether the message content should be encrypted, and if so, the CAA 234 encrypts the message content using the public key of the recipient of the EMM, which is retrieved from the database 240. The authentication token of an EMM is generally a one-way hash digest of the message content that has been digitally signed by the private key of the CAA 234. In the preferred embodiment, the recipient, i.e., the DSCT 110, implicitly trusts any EMM that has an authentication token from the CAA 234 because the CAA 234 signs the hash digest with the private key that corresponds to one of the trusted public keys stored in the DSCT 110.

A one-way secure hash function is a cryptographic operation where input is run through some mathematical operations to produce an output, the hash digest, which is a fixed length and which is probably unique. The hash digest has at least two properties: (1) determining the input to the hash function, given the hash digest, is virtually impossible or at least computationally difficult; and (2) a hash digest for an input is essentially unique. In other words, the probability that two different inputs will result in the same output is extremely small. All of the hash digests discussed in this disclosure are generated from secure one-way hash functions, and a signed hash digest is a hash digest that has been processed by a private key. Signing the hash digest with a private key converts the hash digest from a first value to a second value, and resigning the second value with the corresponding public key transforms it back to the first value. The only way to convert the second value back to the first value is to resign the second value with the public key that corresponds to the private key that originally signed the hash digest.

In the preferred embodiment, the DSCT 110 includes partitionable memory and the CAA 234 partitions the memory of the DSCT 110 using EMMs. The DSCT 110 only partitions its memory in response to EMMs from the CAA 234. The CAA 234 instructs the DSCT 110 to allocate a portion of its memory to the entitlement generator 236 and provides the DSCT 110 with the public key of the entitlement generator 236. Once the DSCT 110 has the public key of the entitlement generator 236, the entitlement generator 236 can securely communicate with the DSCT 110, and thereby provide entitlements for service instances to the DSCT 110. The CAA 234 can also disable the entitlement generator 236 by having the DSCT 110 unallocate the allocated memory. For details regarding allocating and configuring memory in the DSCTs, see U.S. Pat. No. 5,742,677, Pinder et al., Information Terminal Having Reconfigurable Memory, filed Apr. 3, 1995, which is hereby incorporated by reference in its entirety.

The entitlement generator 236 generates encryption information and the entitlements of the DSCTs for the service instances. The entitlement generator 236 provides the encryption information to the multi-transport stream transceiver 228, which generates control words therefrom for encrypting the service instances. In the preferred embodiment, the encryption information is a multi-session key (MSK), which has a relatively long life, such as days, weeks, or months. The MSK is transmitted to the DSCTs 110 in EMMs created by the entitlement generator 236.

The entitlement generator 236 receives EMM templates from the EMM generator 238 for creating EMMs. The EMMs from the entitlement generator 236 also include an authentication token, which is a hash digest digitally signed by the private key of the entitlement generator 236, and the hash digest is a digest of the message content. In some situations, the entitlement generator 236 produces a hash digest of at least a portion of the message content and a secret that is known to the recipient. The entitlement generator 236 determines whether to encrypt the message content and when it is determined to do so, it uses the recipient's private key to encrypt the message content. Typically, when the message content is determined to be private, such as when the content includes an MSK, it is encrypted.

In an alternative embodiment, the system controller 232 includes a main computer and a plurality of transaction encryption devices, which are coupled to the main computer via a secure link, such as a secure dedicated Ethernet connection. Each transaction encryption device includes a processor and a memory for implementing cryptographic algorithms. In this embodiment, the CAA 234 resides in a first transaction encryption device and an entitlement generator 236 resides in each of the remaining transaction encryption devices. Each of the transaction encryption devices that have an entitlement generator are associated with either an entitlement agent or a content provider. An entitlement agent or content provider can use his or her associated transaction encryption device to provide entitlements to the DSCTs 110. In this manner, multiple entitlement agents or content providers can provide content to the DBDS 100, and the operator of the DBDS 100 can delegate the responsibility of providing entitlements to the entitlement agents or content providers.

Control information such as EMMs and other data can be communicated to DSCTs 110 via the in-band delivery path 254 or to DSCTs 110 connected to the headend 102 via an out-of-band delivery path 256. The out-of-band data is transmitted via the out-of-band downstream path 258 of transmission medium 154 by means such as, but not limited to, a Quadrature Phase-Shift Keying (QPSK) modem array 260, or an array of data-over-cable service interface specification (DOCSIS) modems, or other means known to those skilled in the art. Two-way communication utilizes the upstream portion 262 of the out-of-band delivery system. DSCTs 110 transmit out-of-band data through the transmission medium 154, and the out-of-band data is received in headend 102 via out-of-band upstream paths 262. The out-of-band data is routed through router 264 to an application server or to the VOD pump 226 or to control system 232. Out-of-band control information includes such information as a pay-per-view purchase instruction and a pause viewing command from the subscriber location 108 (shown in FIG. 1) to a video-on-demand type application server, and other commands for establishing and controlling sessions, such as a Personal Television session, etc. The QPSK modem array 260 is also coupled to communication link 152 (FIG. 1) for two-way communication with the DSCTs 110 coupled to nodes 106.

The router 264 is used for communicating with the hub 104 through transmission medium 150. Typically, command and control information among other information between the headend 102 and the hub 104 are communicated through transmission medium 150 using a protocol such as but not limited to Internet Protocol. The IP traffic 272 between the headend 102 and hub 104 can include information to and from DSCTs 110, which are connected to the hub 104.

In the preferred embodiment, the multi-transport stream receiver-transmitter 228 is adapted to encrypt content prior to modulating and transmitting the content. Typically, the content is encrypted using a cryptographic algorithm such as the Data Encryption Standard (DES) or triple DES (3DES), Digital Video Broadcasting (DVB) Common Scrambling or other cryptographic algorithms or techniques known to those skilled in the art. The multi-transport stream receiver-transmitter 228 receives instructions from the control system 232 regarding the processing of programs included in the input transport streams 240. Sometimes the input transport streams 240 include programs that are not transmitted downstream, and in that case the control system 232 instructs the multi-transport stream receiver-transmitter 240 to filter out those programs. Based upon the instructions received from the control system 232, the multi-transport stream receiver-transmitter 228 encrypts some or all of the programs included in the input transport streams 240 and then includes the encrypted programs in the output transport streams 242. Some of the programs included in input transport stream 240 do not need to be encrypted, and in that case the control system 232 instructs the multi-transport stream transmitter-receiver 228 to transmit those programs without encryption. The multi-transport streams receiver-transmitter 228 sends the DSCTs 110 the information used to decrypt the encrypted program. It is to be understood that for the purposes of this disclosure a "program" extends beyond a conventional television program and that it includes video, audio, video-audio programming and other forms of services and digitized content. "Entitled" DSCTs 110 are allowed to use the decryption information to decrypt encrypted content, details of which are provided hereinbelow.

The multi-transport stream transmitter/receiver 228 uses the MSK from the control system 232 to encrypt service instances. The multi-transport stream transmitter/receiver 228 includes a counter that produces a numerical value every couple of seconds or so and an encryptor. The encryptor uses the MSK to encrypt the counter value to produce a control word. The control word is used by the encryptor as a key for encrypting a portion of the service instance.

The multi-transport stream transmitter receiver 228 includes the counter value in an entitlement control message (ECM), which is multiplexed into the output transport stream 242. Typically, ECMs are transmitted without being encrypted so that the DSCTs do not have to spend time to decrypting the content of the ECM before generating the control word. However, the ECMs include an authentication token that is used for authenticating the message content and limiting access thereto, as will be explained in detail hereinbelow. Typically, the authentication token is a hash digest of the message content and a secret that is shared with the DSCTs 110, such as the MSK. Only DSCTs that have the MSK will be able to encrypt the counter value of the ECM to generate the control word that decrypts the service instance.

In the preferred embodiment, the entitlement generator 236 associates each encrypted service instance, with a unique entitlement specifier, which is included in the ECM. A DSCT 110 uses the entitlement specifier to determine whether the DSCT 110 is entitled to the service instance.

In the preferred embodiment, the hub 104, which functions as a mini-headend, includes many or all of the same components as the headend 102. The hub 104 is adapted to receive the transport-streams 242 included in the in-band path 254 and redistribute the content therein throughout its sub-distribution network 160. The hub 104 includes a QPSK modem array (not shown) that is coupled to communication links 152 and 154 for two-way communication with DSCTs 110 that are coupled to its sub-distribution network 160. Thus, it is also adapted to communicate with the DSCTs 110 that are coupled to its sub-distribution network 160, with the headend 102, and with the content providers 114.

DSCT 110

Figure 3:
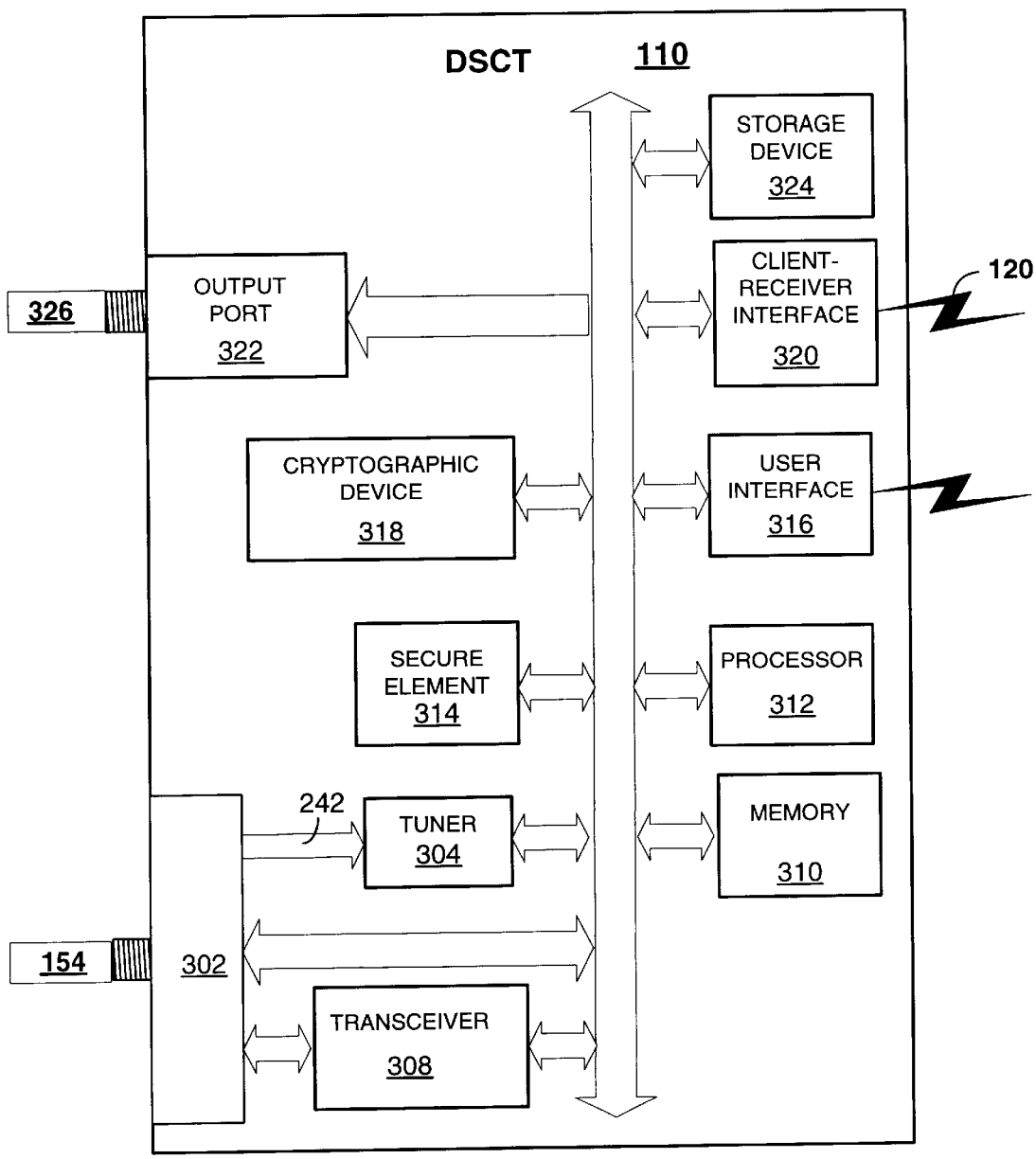
FIG. 3 is a block diagram of the digital subscriber communication terminal.

Referring now to FIG. 3, the DSCT 110 is adapted to receive in-band and out-of-band communication at input-port 302 and output signals via output-port 322 and client-receiver interface 320. Output-port 322 couples to connector 326, which provides a communication path between the DSCT 110 and a subscriber device such as, but not limited to, a television, a VCR, a computer, or the like. In the preferred embodiment, client-receiver interface 320 includes a transceiver for a wireless communication link 120 between the DSCT 110 and a client-receiver 122.

In an alternative embodiment, the client-receiver interface 320 includes a transceiver for a wired communication link between the DSCT 110 and the client-receiver 120. The wired communication link can be, but is not limited to, twisted wire pair, Ethernet, telephone lines, and electrical wiring. In yet another embodiment, the DSCT 110 includes multiple client-receiver interfaces 320 for communication with more than one client-receiver 122.

The operation of the DSCT 110 shall first be described with respect to a television coupled to output-port 322 and then, secondly, with respect to a client-receiver 122, such as a laptop computer or a set top, coupled to the DSCT 110 through the wireless communication link 120.

The DSCT 110 includes a user-interface 316, such as an infrared receiver, through which the user enters commands, such as selecting a "user-channel" for viewing a selected service instance. It is important to remember that a "user-channel" is not a conventional television channel. A conventional television channel in a cable television system is a 6 MHz band (which carries one analog program) centered on a particular frequency. However, today a "user-channel" conceptively corresponds to a service instance or a string of service instances in the preferred embodiment of the present invention. Frequently, multiple service instances are multiplexed together in a transport stream, and the transport stream is RF modulated and transmitted in a 6 MHz band. Thus, a single 6 MHz band carries multiple service instances or user-channels. When a user changes programs or service instances by selecting a new user-channel, the new user-channel and the old user-channel might be carried in the same 6 MHz band or in different 6 MHz bands. So it is important to distinguish between a conventional channel and a user-channel. It is to be understood user-channel represents one type of communication channel. Communication channels include, but are not limited to, communication signals that are separated by: frequency, which is generally referred to as frequency-division multiplexing (FDM); time, which is generally referred to as time-division multiplexing (TDM); and code, which is generally referred to as code-division multiplexing (CDM).

In the preferred embodiment, the transceiver 308 receives out-of-band communication 258 from input port 302. The out-of-band communication data includes among other things system tables and messages including secure messages such as EMMs. EMMs are sent to the secure element 314 for processing and the system tables are stored in memory 310. In the preferred embodiment, the transceiver 308 is tunable over a range of predetermined frequencies and is controlled by processor 312. In an alternative embodiment, the DSCT 110 includes a plurality of tunable transceivers that are controlled by the processor 312. In another preferred embodiment, the processor 312 controls at least one of the transceivers and the client-receiver interface 320 controls at least one of the transceivers.

In the preferred embodiment, the system tables stored in memory 310 are tables of system information such as program number tables and encryption tables, which identify, among other things, whether a program is encrypted or not. System tables are prepared by the control system 232 and transmitted to the DSCT 110 via in-band or out-of-band communication paths.

The processor 312 receives the user input from the user interface 316 and determines the frequency band that contains a selected user-channel. Generally, the multiplexed service instances are in the form of MPEG programs. In that case, the processor 312 consults system information tables, which are stored in memory 310, to determine the frequency band of the selected user-channel and the MPEG program number for the selected user-channel. The processor 312 instructs the tuner 304 to tune to the desired frequency and to provide it with a program association table (PAT) for that frequency band.

The tuner 304 receives in-band communication from input-port 302, which is coupled to the transmission medium 154. In response to instructions from the processor 312, the tuner 304 tunes to the specified frequency band. Typically, the tuner 304 also includes a demultiplexer for demultiplexing the received transport stream 242. The tuner 304 extracts a PAT (the packet that has the PID value of 0) from the received transport stream 242 and sends the PAT to the processor 312. The processor 312 uses the PAT to determine which PMT is associated with the selected service instance, and instructs the tuner 304 to provide it with the appropriate PMT. Using the PMT, the processor 312 determines the elementary streams that make up the selected service instance and then instructs the tuner 304 to extract those elementary streams from the received transport stream 242.

Frequently, the transport stream 242 includes some service instances that are not encrypted and some that are encrypted. The processor 312 uses the system tables to identify encrypted service instances and unencrypted service instances. If the processor 312 determines the selected service instance is not encrypted, the processor 312 instructs the tuner 304 to send the selected service instance to the output-port 322. On the other hand, if the selected service instance is encrypted, the processor 312 instructs the tuner 304 to send the selected service instance to the cryptographic device 318.

Generally, the PMT of a service instance includes the PID value of the ECM for the service instance. In that case, the processor 312 tells the tuner 304 to extract those ECMs and send them to the secure element 314. The ECMs include information used for decrypting the selected service instance and also include an entitlement specifier.

The secure element 314 is used for, among other things, providing cryptographic device 318 with the control word used for decrypting the selected service instance. It is important to note that in the conditional access system of the DBDS 100 the DSCT 110 might not be able to access a selected service instance even though the DSCT 110 has the necessary keys used for decrypting the selected service instance. In other words, in addition to having all the keys used in accessing the selected service instance, the DSCT 110 must be "entitled" to access the selected service instance. The DSCT 110 receives entitlements for service instances from the Entitlement Generator 236 of the control system 232.

When the DSCT 110 is entitled to the selected service instance, the secure element 314 provides the cryptographic device 318 with the control word used for decrypting the selected service instance. The cryptographic device 318 decrypts the selected service instance using the control word from the secure element 314 and the decrypted service instance is sent to the output port 322. The manner in which the secure element 314 determines whether the DSCT 110 is entitled is described in detail hereinbelow.

The DSCT 110 also includes a storage device 324 for storing service instances. The user can use the user interface 316 to instruct the DSCT 110 to store a received service instance in storage device 324. In another embodiment, the storage device is external to the DSCT 110, and in that case, the service instance is sent to the external storage device through output-port 322 or through an input/output interface (not shown).

Among other things, the DSCT 110 interfaces with client-receivers 122 via communication link 120. In the preferred embodiment, the communication link 120 is a wireless communication link, and the client-receiver interface 320 is a card that can be installed in the DSCT 110 by a user or qualified technician. The client-receiver interface 320 includes a transceiver for communicating with the client-receiver 122. In the preferred embodiment, the bandwidth of the client-receiver interface 320 is such that it can communicate with multiple client-receivers. In one embodiment, the DSCT 110 is adapted to accept multiple client-receiver interfaces 320 for communicating with multiple client-receivers 122.

In one embodiment, the client-receiver interface 320 also includes logic for implementing the encryption/decryption of information transmitted between the client-receiver and the DSCT 110 and for controlling one of the tuners 304 and one of the transceivers 308. The logic of the present invention can be implemented in hardware, software, firmware, or a combination thereof. In the preferred embodiment(s), the logic is implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc. In an alternative embodiment, the logic is implemented in software or firmware that is stored in a memory and that is executed by a suitable instruction execution system.

In an alternative embodiment, instead of the client-receiver interface 320 being a card that is installable, the client-receiver interface 320 is a fixed part of the DSCT 110. Whether the client-receiver interface 320 is an installable card or not is a matter of implementation.

The memory 310 also includes tables, which are used for, among other things; identifying a client-receiver 122 and establishing secure communication therewith. In the preferred embodiment, the DSCT 110 manages a local wireless network, and the client-receiver 122 is adapted to discover the wireless network when it is brought into the network. In an alternative embodiment, the DSCT 110 manages a local wired network, and the client-receiver 122 discovers the network and the network discovers the client-receiver 122 when the client-receiver 122 is coupled to the DSCT 110 through the network.

The client-receiver 122 transmits a message to the DSCT 110, which includes hardware information about the client-receiver 122. The processor 312 uses the tables of memory 310 to identify the device type of the client-receiver 122. For example, the received message includes hardware information that the processor 312 uses to determine whether the client-receiver 122 is a computing device such as a laptop or a personal digital assistant, or a set top device, among others. The DSCT 110 and the client-receiver 122 establish communication using protocols known to those skilled in the art, including but not limited to Open Server Gateway interface (OSGi), Jini, Home Audio/Video interoperability (HAVi), and Universal Plug-n-Play (UPnP). In another non-limiting embodiment, the DSCT 110 receives the message from the client-receiver 122 and forwards at least part of the message to the headend 102. The control system 232 uses the message from the DSCT 110 and the database 240 to identify the client-receiver 122, and the control system 232 sends a message to the DSCT 110 instructions on how or whether to establish secure communication with the client-receiver 122.

The memory 310 includes logic for dynamic encryption scheme determination. Generally, the content transmitted from the DSCT 110 to the client-receiver 122 is transmitted so as to protect the privacy of the communication. The encryption scheme implemented by the DSCT 110 and the client-receiver 122 is determined by considering factors such as the device type of the client-receiver 122 and the communication medium. For example, when the client-receiver 122 is a laptop, the encryption scheme may be different from when the client-receiver 122 is a PDA or set top. Non-limiting examples of dynamic encryption scheme determination logic include, but are not limited to, secure sockets layer (SSL) protocol, Digital Transmission Content Protection (DTCP), Content Protection for Recordable Media (CPRM), and transport layer security (TLS) protocol. These protocols and other dynamic encryption scheme determination logic known to those skilled in the art are intended to be within the scope of the invention.

Figure 4:
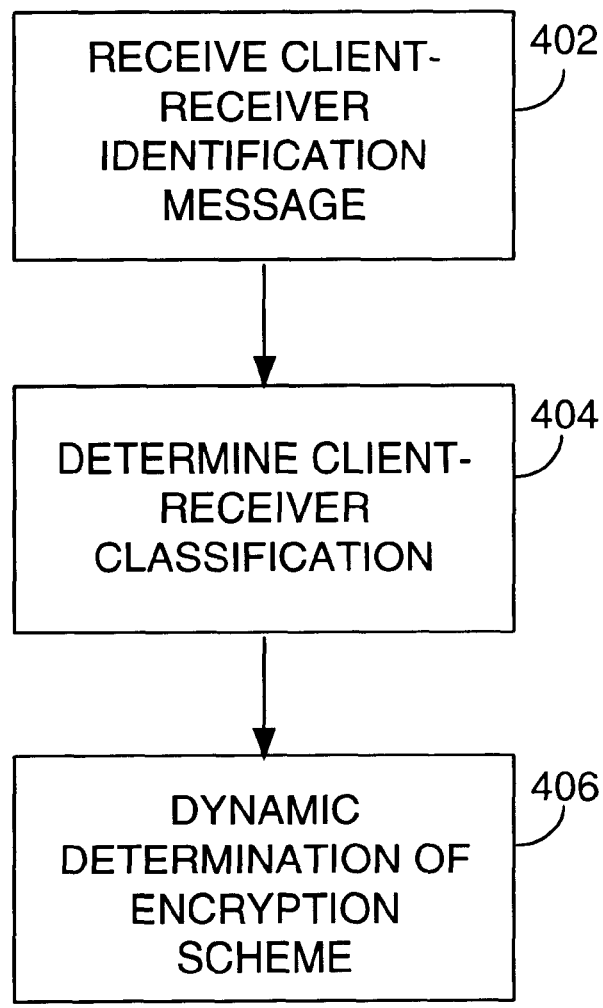
FIG. 4 is a flow chart of steps taken to dynamically establish an encryption scheme.

Referring now to FIG. 4, the steps 400 are implemented for establishing private communication between the DSCT 110 and the client-receiver 122. In step 402, the DSCT 110 receives a client-receiver identification message from the client-receiver. The message is sent to the DSCT 110 when the client-receiver 122 discovers the local network maintained by the DSCT 110. The message includes device information such as hardware information about the client-receiver 122.

In step 404, the processor 312 uses tables stored in memory 310 and the received client-receiver identification message to determine a classification for the client-receiver 122. The processor 312 in negotiating an encryption scheme with the client-receiver 122 uses the classification of the client-receiver 122.

In step 406, the processor 312 implements logic for negotiating an encryption scheme for the client-receiver 122. In the preferred embodiment, the encryption scheme is determined dynamically, when the client-receiver 122 is coupled to the local area network. In an alternative embodiment, the encryption scheme is determined dynamically responsive to dynamic changes in the local area network, such as the amount of content delivered to the client-receiver 122, or responsive to user input. For example, the user of the client-receiver 122 might desire a different level of encryption than the one that was negotiated. In that case, user selects the different level, higher or lower, and the client-receiver 122 in the DSCT 110 negotiate a new level of security based upon the input of the user. However, in the preferred embodiment, the DSCT 110 can override the input of the user when negotiating the encryption scheme, so as to maintain at least a predetermined minimum level of security.

In another non-limiting example, the encryption scheme is dynamically determined responsive to the content type being transmitted to the receiver. For example, when the content type is a program or service instance that is transmitted to the headend 102 to the DSCT 110 without encryption, the content is transmitted to the client-receiver with no encryption or a low level of encryption. Whereas, when the content type is an encrypted program or encrypted service instance, then the content type is transmitted to the client-receiver with a high level of encryption. Thus, when the user of the client-receiver 122 changes from one user-channel to another or requests a different type of content, the encryption scheme is dynamically determined.

Figure 5:
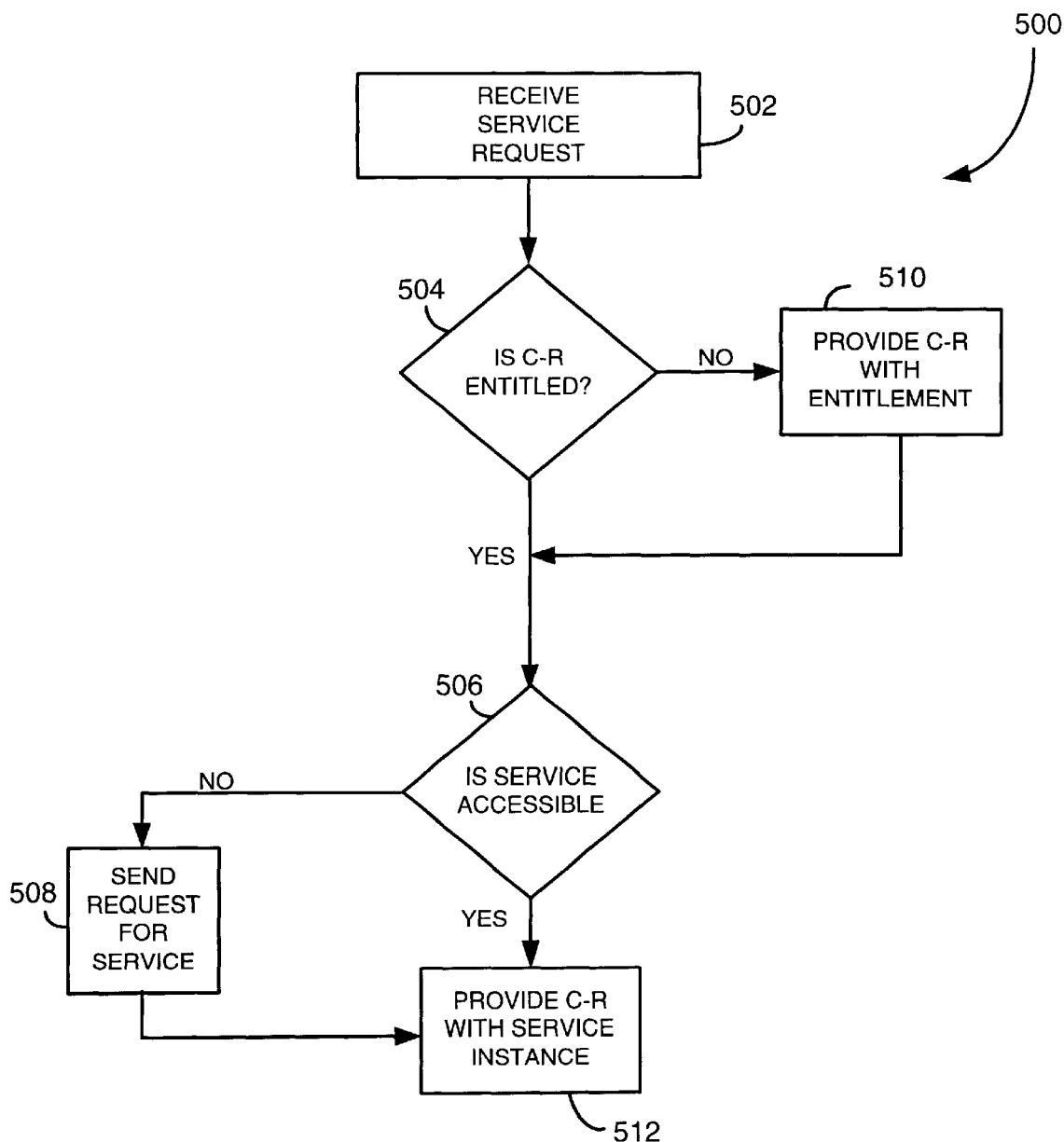
FIG. 5 is a flow chart of steps taken in determining whether to provide a service instance to a client-device.

Referring to FIG. 5, steps 500 are implemented by processor 312 and the secure element 314. In step 502, the DSCT 110 receives a request from the client-receiver 122 for a service instance. The service instance is generally a user selected service instance such as a program selected by the user of the client-receiver 122. In another embodiment, the service instance is a service such as an Internet connection.

In step 504, the secure element 312, which maintains a map of entitlements granted to the client-receiver, determines whether or not the client-receiver 122 is entitled to the requested service instance. The entitlement map associates services with entitlements. If the client-receiver 122 is entitled to the service instance, the processor 312 proceeds to step 506 and determines whether the service instance is accessible at the DSCT 110. Some service instances are accessible to the DSCT 110 in response to requests of the user. For example, the DBDS 100 might include personal television, whereby the transmission of the service instance is controlled by the user, which means the transmission can be paused, rewound, etc., just like a VCR. Another non-limiting example of a requested service instance includes pay-per-view programming.

If the selected service instance is not accessible at the DSCT 110, in step 508, the DSCT 110 sends a request for the service instance to the headend 102. In the preferred embodiment, the secure element 314 generates a secure message for the request of the user and sends it to the transceiver 308 for transmission to the headend 102. In an alternative embodiment, the processor 312 forwards the service request from the client-receiver 122 to the headend 102. In yet another embodiment, the processor 312 generates the service request for client-receiver 122. In response to the request for the service, the headend 102 provides the service to the DSCT 110. Generally, the service is included in transport stream 242.

In step 510, the client-receiver 122 is provided with the entitlement for the selected service instance. In the preferred embodiment, the secure element 314 generates the entitlement for the selected service instance and provides the entitlement to the client-receiver 122. Typically, the secure element 314 generates an EMM, which includes the entitlement, and sends the entitlement to the client-receiver 122 via the communication link 120. In this embodiment, the DSCT 110 acts as an entitlement granting authority for the client-receiver 122. The DSCT 110 has the authority and capacity to grant and delete entitlements to the client-receiver 122 for the service instance.

The secure element 314 also updates the entitlement map so that the state of the entitlement associated with the service corresponds to the newly granted entitlement. Thus, the secure element 314 can readily determine whether the client-receiver 122 is entitled to (or is not entitled to), i.e., it is permitted to (or is not permitted to), receive a service instance merely by checking the entitlement map. In addition, the secure element 314 sends a message to the system controller 232 that indicates that the client-receiver 122 has been granted an entitlement, which the system controller 232 can use for billing purposes.

In one preferred embodiment, the secure element 314 generates a secure message requesting entitlement for the selected service instance for the client-receiver 122 and sends the secure message to the entitlement generator 236. Generally, the secure message includes message content that is encrypted by the public key of the entitlement generator and an authentication token, which is a hash digest of the message content signed by the private key of the DSCT 110.

The entitlement generator 236 receives the secure message from the DSCT 110 and provides the entitlement for the selected service instance to the DSCT 110 in an EMM. The secure element 314 of the DSCT 110 then processes the EMM and provides the entitlement to the client-receiver 122. In step 512, the selected service instance is provided to the client-receiver 122. It should be noted that steps 500 are merely exemplary, and in alternative embodiments, more or less, steps are implemented. For example, in another non-limiting example, the processor 312 determines whether or not the client-receiver 122 should be entitled to the selected service instance. In that embodiment, the DSCT 110 can be used to regulate the service instances provided to the client-receiver 122.

In one preferred embodiment, the DSCT 110 receives the service request from the client-receiver 122 and forwards it to the headend 102 without any processing. In that case, headend 102 decides on the encryption scheme used for transmitting the service instance to the client-receiver 122 and the DSCT 110 acts as a gateway for the client-receiver 122. The headend 102 can use information related to the billing status of the subscriber and/or knowledge of the hardware type for the client-receiver 122.

In one preferred embodiment, the DSCT 110 receives service requests from the client-receiver 122 and processes them. The secure element 314 generates a secure message for the service request, and the headend 102 determines whether to entitle or not entitle the client-receiver 122 for the selected services. In addition, when the headend 102 decides to entitle the client-receiver 122 for the requested service, the headend 102 can also determine the encryption scheme for the selected service. In this case, the DSCT 110 acts as a proxy for the client-receiver 122 by forwarding service requests and having the headend 102 make the determinations.

In one preferred embodiment, when the DSCT 110 or the headend 102 determines that the client-receiver 122 is not entitled to a requested service instance, the DSCT 110 sends a service denied message to the client-receiver 122. Upon receipt of the service denied message, the client receiver 122 informs the subscriber using the client-receiver 122 that the service was denied.

In one preferred embodiment, when the DSCT 110 receives a service request from the client-receiver 122, the DSCT 110 determines whether to provide the requested service to the client-receiver based upon local availability of the requested service. When the requested service is currently being used by the DSCT 110 or a different client-receiver, the DSCT 110 can decide not to provide the client-receiver 122 with the requested service.

Figure 6:
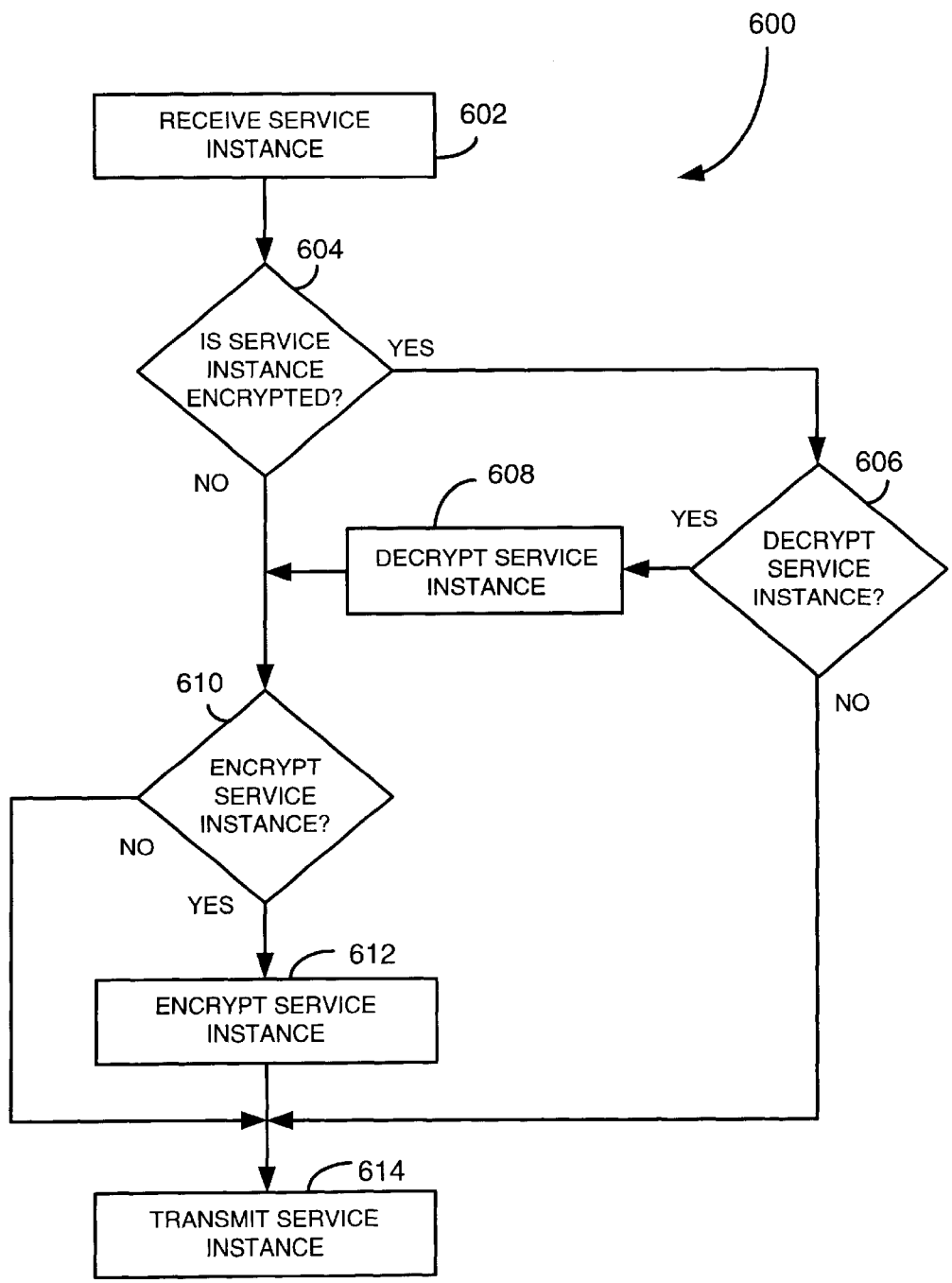
FIG. 6 is a flow chart of steps taken to provide a service instance to a client-device.

Refer now to FIG. 6, in the preferred embodiment, the logic implemented in steps 600 resides in the secure element 314, processor 312, and the cryptographic device 318. In step 602, the selected service instance is received by the tuner 304, which is controlled by processor 312. In an alternative embodiment, the selected service instance is stored on storage device 324 and is retrieved therefrom.

In step 604, the processor 312 uses system tables to determine whether or not the service instance is encrypted. If the selected service instance was encrypted at the headend, the processor 312 determines in step 606 whether the service instance should be decrypted. The processor 312 uses system information tables stored in memory 310 for that determination. If the content of the service instance is not to be decrypted, the processor 312 instructs the tuner 304 to send the service instance to the client-receiver interface 320, which in step 614 transmits the service instance.

On the other hand, when the processor 312 determines to decrypt the service instance, the processor 312 instructs the tuner to send the service instance to the cryptographic device 318. In step 608, the cryptographic device 318 decrypts to the service instance using the control word(s) provided by the secure element 314.

In step 610, the processor 312 determines an encryption scheme for the selected service instance. The encryption scheme can be either to encrypt or not encrypt the selected service instance. This determination is made for the decrypted service instance and for received unencrypted service instances. The processor 312 uses system tables stored in memory 310 for that determination. In one embodiment, the determination includes factors such as the content being sent to the client-receiver 122. For example, when the content is Internet information, the content might be encrypted to protect the privacy of the user, even though the information may not have been transmitted from the headend 102 with encryption.

When the processor 312 determines to encrypt the service instance, then in step 612, the service instance is provided to the cryptographic device 318. The cryptographic device 318 encrypts the service instance using an encryption scheme that was dynamically negotiated by the DSCT 110 and the client-receiver 122. Typically, the secure element 314 provides the cryptographic device 318 with the encryption keys used by the cryptographic device 318 to encrypt the service instance.

On the other hand, when the processor 312 determines not to encrypt the selected service instance, the selected service instance is provided to the client-receiver interface 320. In step 614, the client-receiver interface 320 transmits the service instance to the client-receiver 122.

Figure 7:
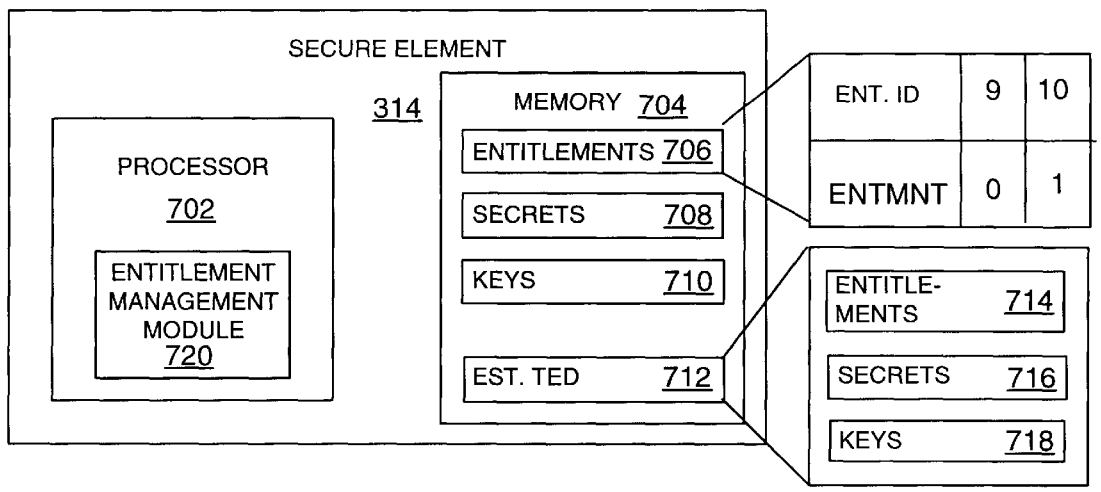
FIG. 7 is a block diagram of a secure element.

Referring to FIG. 7, the secure element 314 includes a processor 702 and a memory 704. The memory 704 is accessible only to the processor 702 and it includes entitlements 706, secrets 708, and keys 710. In the preferred embodiment, the processor 702 and memory 704 are packaged in tamper resistant packaging such that no other device other than processor 702 can access the memory 704. This protects the contents of memory 704 and helps insure that private information remains private and confidential.

The keys 710 include a public key-private key pair for the DSCT 110, which were given to the secure element 314 during the manufacture thereof, and public keys for client-receivers 122 that are in the local network managed by the DSCT 110. The private key of the DSCT 110 is stored in the memory 704 and is not given to any processor other than processor 702. However, the public key of the DSCT 110 is provided to other devices of the DBDS 100, such as the CAA 234 and Entitlement Generator 236 of the control system 232 and to the client-receiver 122. The holders of the DSCT's public key can use the public key for authenticating messages signed by the private key of the DSCT 110 and also for encrypting messages sent to the DSCT 110.

The secrets 708 are secrets that are shared between the DSCT 110 and the client-receiver 122. In the preferred embodiment, the secrets 708 are used for, among other things, encrypting service instances provided to the client-receiver 122, generating authentication tokens for messages transmitted to the client-receiver 122 and authenticating messages from the client-receiver 122.

The entitlements 706 include an entitlement map for entitlements that have been given to the client-receiver 122. The entitlement map associates an entitlement identifier (ID), which is associated with a service instance, with the client-receiver's entitlement for that service instance. For example, in the exemplary entitlement map 706 the client-receiver 122 is entitled to access a service instance having an entitlement ID of 10 but not entitled to access a service instance having an entitlement ID of 9. Among other things, the entitlement map 706 is used for billing purposes, keeping track of the entitlements granted to the client-receiver 122 so that the subscriber can be properly billed, and for determining which services the client-receiver 122 is entitled to receive.

The memory 704 also includes allocated memory 712, which has been allocated to the Entitlement Generator 236. The allocated memory 712 includes the entitlements 714 that the Entitlement Generator 236 has given the DSCT 110 to access service instances, secrets 716 used for creating control words to decrypt service instances, and keys 718 from the CAA 234 and the Entitlement Generator 236. The keys 718 include the public key for the Entitlement Generator 236, which the CAA 234 sent to the DSCT 110 in an EMM.

The processor 702 includes an authorization/entitlement management module (AEMM) 720. The AEMM 720 provides entitlements to the client-receiver 122 for service instances. The AEMM 720 also authenticates messages from the client-receiver 122, and generates secure messages for the client-receiver 122. In the preferred embodiment, the AEMM 720 receives EMMs for the DSCT 110 from the headend 102 and EMMs from the client-receiver 122, and the AEMM 720 authenticates them. If the EMMs are for the DSCT 110 and are authenticated by the AEMM 720, the AEMM 720 responds to the EMMs and implements them.

Figure 8A:
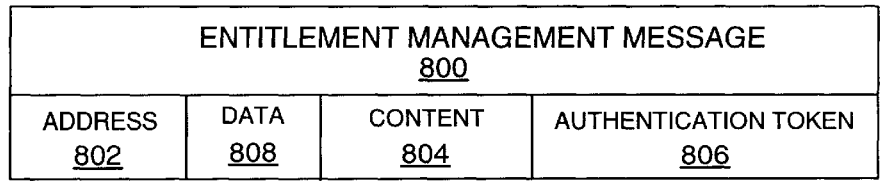
FIG. 8A is a block diagram of an entitlement management message.

Referring now to FIG. 8A, an entitlement management message 800 includes an address field 802, message content 804 and an authentication token 806. EMM 800 is a typical EMM used for securely transmitting information between the headend 102 and the DSCT 110, between the headend 102 and the client-receiver 122, and the between the DSCT 110 and the client-receiver 122. The EMM 800 is an exemplary secure message.

The address field 802 includes the address of the recipient. For example, the address field 802 of an EMM from the headend 102 to the DSCT 110 includes the IP address or serial number of the DSCT 110. Whereas, in an EMM 800 sent from the DSCT 110 to the client-receiver 122, the address field 802 includes the address of the client-receiver 122 in the local area network maintained by the DSCT 110. In alternative embodiments, the address field 802 is the IP address of the client-receiver or a unique identifier, which is unique to the client-receiver 122 in the DBDS 100. Typically, the address is provided to the secure element 314 by the processor 312 using the tables and memory 310. The message content 804 is the substance of the message. It includes the information that the sender intended the recipient to receive. Depending upon the information included therein, the message content 804 can be encrypted or not. The AEMM 820 determines whether or not the message content is encrypted.

A data field 808 includes data for processing the EMM 800. The data field 808 includes key identifiers that are used for identifying the keys used in encrypting and signing portions of the EMM 800. For example, when the content 804 is encrypted by the public key of the recipient, the data field 808 indicates that the content 804 is encrypted and which public key was used for the encryption.

Whether the message content 804 is encrypted depends upon whether or not privacy is desired. For example, if the message content 804 is a public key, which are distributed to multiple elements of the DBDS 100, then the message content 804 might not be encrypted. Whereas, when the message content 804 is related to entitlements, or encryption, or decryption, then the message content 804 will probably be encrypted. Whether the message content 804 is encrypted is a matter of implementation and depends upon the sought after level of security in the DBDS 100 and between the DSCT 110 and the client-receiver 122.

The authentication token 806 is used for authenticating the purported sender of the EMM 800 and for validating the message content 804, i.e., checking that the received message content is the same as what was sent. In other words, among other things, the recipient of the EMM 800 uses the authentication token 806 to make certain that the message content 804 was not tampered with nor garbled during transmission. Typically, as described below, the private key of the sender signs the authentication token 806.

Figure 8B:
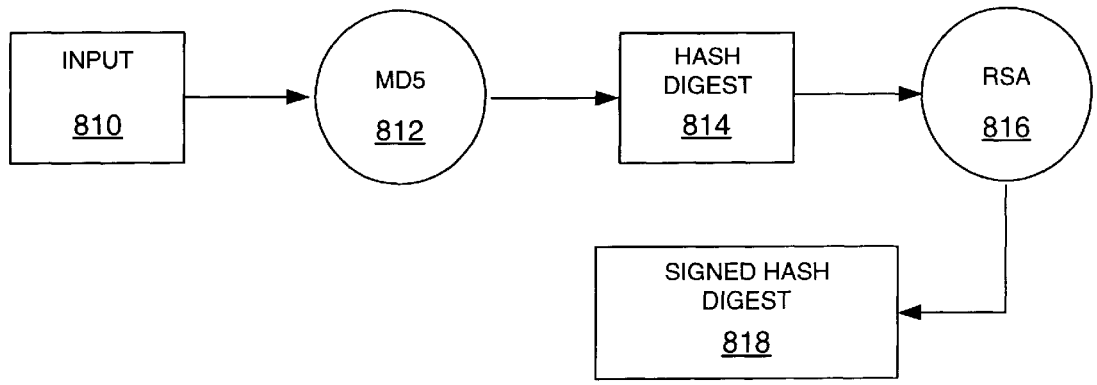
FIG. 8B is a block diagram representing making an authentication token used in the entitlement management message.

FIG. 8B illustrates the exemplary creation of the authentication token 806, where circles denote processes or functions and rectangles denote objects or output. A secure one-way hash function 812, such as MD 5, receives input 810 and produces the hash digest 814. The input 810 includes the unencrypted message content 804 or at least a portion thereof. In an alternative embodiment, the input 810 also includes a secret, which is shared with the recipient of the EMM 800. Typically, the recipient receives the secret in a separate EMM and stores the secret, so that the secret can be used to authenticate subsequent EMMs. For example, secrets 716 are secrets that the Entitlement Generator 236 has given to the DSCT 110, and secrets 708 are secrets the DSCT 110 has given to the client-receiver 122.

The hash digest 814 is a value that is dependent upon the input 810. If the input 810 is changed, the value of the hash digest also changes.

The hash digest 814 is digitally signed by the digital signature function 816 using a cryptographic technique such as RSA, to produce the signed hash digest 818. Digitally signing the hash digest 814 converts the value of the hash digest 814 to a different value. The value of the signed hash digest 818 is changed back to the original value of the hash digest 814 by applying the correct key with the correct digital signature function 816 to the signed hash digest 818. In the preferred embodiment, the digital signature function applies a private key to the hash digest 814 to generate the signed hash digest 818, and the corresponding public key is used on the authentication token 818 to regenerate the hash digest 814. In the preferred embodiment, the CAA 234 and the Entitlement Generator 236 of the control system 232, the DSCT 110 and the client-receiver 122 include the logic for making signed hash digests 818, which are then used as authentication tokens 806. Referring again to FIG. 7, the AEMM 720 includes the logic for authenticating and decrypting a received EMM 800. If the EMM is encrypted, the AEMM 720 uses the private key of the DSCT 110 to decrypt the message content, thereby converting the ciphertext content 804 to clear text content. The AEMM 720 uses the cleartext content and the authentication token 806 to authenticate the EMM.

Generally, the AEMM 720 determines whether a shared secret is part of the hash digest using information included in the data field 808, and if it is, then the shared secret is retrieved from memory 704. If there was no shared secret, the AEMM 720 generates a bash digest of the clear text content. However, if there was a shared secret, the AEMM 720 generates a hash digest of the clear text content and the shared secret. Then, AEMM 720 uses the data field 808 of the EMM 800 to determine the purported sender of the EMM 800, and uses the public key of the purported sender to convert the value of the authentication token 806 to the value of the original hash digest 814. Finally, if the original hash digest 814 and the hash digest generated by the recipient have the same value, then the AEMM 720 determines that the EMM 800 is authentic and valid. In other words, the AEMM 720 determines that the EMM 800 did in fact come from its purported sender and the message content 804 has not been corrupted or tampered with.

The AEMM 720 also includes logic for implementing the instructions included in the message content 804. For example, the CAA 234 sends an EMM 500 to the DSCT 110 to establish the Entitlement Generator 236 with the DSCT 110. The AEMM 720 authenticates the EMM 800 as having come from the CAA 234 of the control system 232 and partitions the memory 704 to create allocated memory 712. For details of allocated memory see Pinder, U.S. Pat. No. 5,742,677, which is hereby incorporated by reference in its entirety. The AEMM 720 then stores the public key of the Entitlement Generator 236 in keys 718. The public key is provided to the DSCT 110 in an EMM from the CAA 234.

The Entitlement Generator 236 can use the allocated memory 712 to provide entitlements for the service instances that are provided to the DBDS 100. The Entitlement Generator 236 sends the DSCT 110 EMMs that are signed by the private key of the Entitlement Generator 236. AEMM 720 uses the public key of the Entitlement Generator 236, which is stored in allocated memory 712, to authenticate the EMMs. When the EMMs 800 are valid, the AEMM 720 acts upon those EMMs. For example, the message content 804 of the EMM 800 can instruct the AEMM 720 to change the entitlements 714. In the preferred embodiment, entitlements for service instances from the entitlement generator 236 are stored in entitlements 714 as an array. Each encrypted service instant is associated with an element in the entitlement array. The entitlement specifier, which is included in the ECM for a given service instance, is used for determining an array element that has the entitlement of the DSCT 110 for the given service instance. In a non-limiting example, the entitlement specifier for "The Dirty Dozen" is 25 and the 25th array element of the entitlements 714 is the entitlement of the DSCT 110 for "The Dirty Dozen." Generally, the entitlement is binary, YES or NO, 1 or 0. Thus, the DSCT is either entitled or not entitled to the service instance. It should be noted that the DSCT 110 can have all of the keys for accessing a service instance but still not be entitled to the service instance, and if it is not entitled, the DSCT 110 does not decrypt the selected service instance.

When a user selects a service instance, the secure element 314 determines whether the DSCT 110 is entitled to the service instance. The AEMM 720 receives the ECM that is associated with the selected service instance, and authenticates the ECM. The ECM includes the entitlement specifier, a control word indicator (the counter value) and an authentication token, which is a hash digest of the control word indicator and a shared secret.

Generally, the shared secret is the MSK, which the entitlement generator 236 sent to the DSCT 110 in a prior EMM and which is currently stored in secrets 716. The AEMM 720 generates a hash digest of the control word indicator and the shared secret and compares the generated hash digest with the authentication token. If they are not the same, the ECM was either garbled in transmission or tampered with. In either case, the ECM is ignored.

ECMs are received every couple of seconds, so if one was garbled another one is received shortly thereafter, which is then authenticated. If the ECM is successfully authenticated, i.e., it has not been tampered with or garbled, then the AEMM 720 checks the entitlement of the DSCT 110 for the selected service instance. The AEMM 720 uses the entitlement specifier of the ECM and the entitlements 714 to determine the DSCT's entitlement. Only if the DSCT 110 is entitled, does the secure element 314 to provide the cryptographic device 318 with the control word for decrypting the service instance. In the preferred embodiment, encrypting the control word indicator using the MSK as the encryption key generates the control word.

In the preferred embodiment, the AEMM 720 includes logic for granting entitlements to the client-receiver 122 for service instances. When the AEMM 720 receives a request from the client-receiver 122 for a service instance, the AEMM 720 determines whether the client-receiver 122 is currently entitled to the service instance by checking the entitlements 706. If the client-receiver 122 is not entitled, the AEMM 720 determines whether to entitle the client-receiver 122. If the AEMM 720 determines to grant the entitlement to the client-receiver 122, the AEMM 720 provides the client-receiver 122 with the entitlement via an EMM, and the AEMM 720 changes the entitlements 706 to reflect the newly granted entitlement. In other words, the array element of elements 706 associated with the service instance would be changed from NO to YES or from 0 to 1. The AEMM 720 can also delete an entitlement for the client-receiver 122 to a service instance by changing the array element that is associated with the service instance. In the preferred embodiment, the client-receiver 122 includes an entitlement map that it uses for accessing received service instances. The AEMM 720 can up date the client-receiver's entitlement map by sending the client-receiver 122 an EMM with new entitlements for the client-receiver 122. The client-receiver 122 receives the EMM and processes it, thereby updating its entitlements.

In an alternative embodiment, the memory 704 includes an authorization map (not shown), which maps authorizations granted to the client-receiver by an entitlement agent to service instances. Before the AEMM 720 checks the entitlements 706 of the client-receiver 122 for a service instance it checks the authorization map to determine whether the client-receiver is authorized to receive that service. The AEMM 720 will not grant entitlement for a service instance unless the entitlement map indicates that the client-receiver 122 is authorized to receive that service. The AEMM 720 only changes or updates the authorization map in response to EMMs from the system controller 232.

In the preferred embodiment, the client-receiver 122 request services or service instances using secure messages. The processor 702 uses entitlement 706 to determine whether the client-receiver 122 is currently entitled to the requested service instance. If it is not entitled, the processor 702 sends processor 312 a message indicating that the client-receiver 122 has requested a specific service or service instance, and the processor 312 uses tables memory 310 to determine whether the specific service or service instance is blocked. In this embodiment, users can use the user interface 316 to input information, which is stored in tables of memory 310, to block services or service instances provided to the client receiver 122. Thus, the DSCT 110 can act as a filter to prevent certain content such as sexually oriented content from being provided to the client-receiver 122. The system controller 232 can also block services or service instances. In that case, the system controller 232 sends messages and/or tables to the DSCT 110 that instruct the DSCT 110 which types of client-receiver devices can receive which type of service or service instance. For example, the system controller 232 can instruct the DSCT 110 to block services or service instances from a client-receiver 122 when the client-receiver 122 is PC and the services or service instances are in a digital format such as MPEG. If the requested service instance is not blocked, the processor 702 grants entitlement for the selected service instance and updates entitlement 706. The entitlement for the service instance is transmitted to the client receiver 122 in an EMM 800.

In the preferred embodiment, the system controller 232 can send an EMM 800 to the AEMM 720 that suspends the entitlements of the client-receiver 122 to service instances. The system controller 232 can send an entitlement suspension EMM that suspends the entitlement of a specific client-receiver 122 coupled to the DSCT 110 or all client-receivers coupled to the DSCT 110. The system controller 232 may send an entitlement suspension EMM based upon the hardware type of the client-receiver 122. For example, if the operator of the DBDS 100 learns that the security of a particular type of hardware such as a computer having a given operating system has been compromised, the operator can then have the system controller 232 suspend entitlements for all client-receivers 122 coupled to the DBDS 100 until a fix for the security breach has been established. When the DSCT 110 receives an entitlement suspension EMM, the DSCT 110 suspends transmitting service instances to the client-receiver 122.

The system controller 232 can also send an EMM to the DSCT 110 instructing the processor 312 to no longer determine the encryption scheme for the client-receiver 122. In that case, the headend 102 determines the encryption scheme used to communicate information between the DSCT 110 and the client-receiver 122. The headend uses information related to the hardware and software of the client-receiver 122 and the type of communication link 120 between the DSCT 110 and the client-receiver 122.

Client-Receiver

Figure 9:
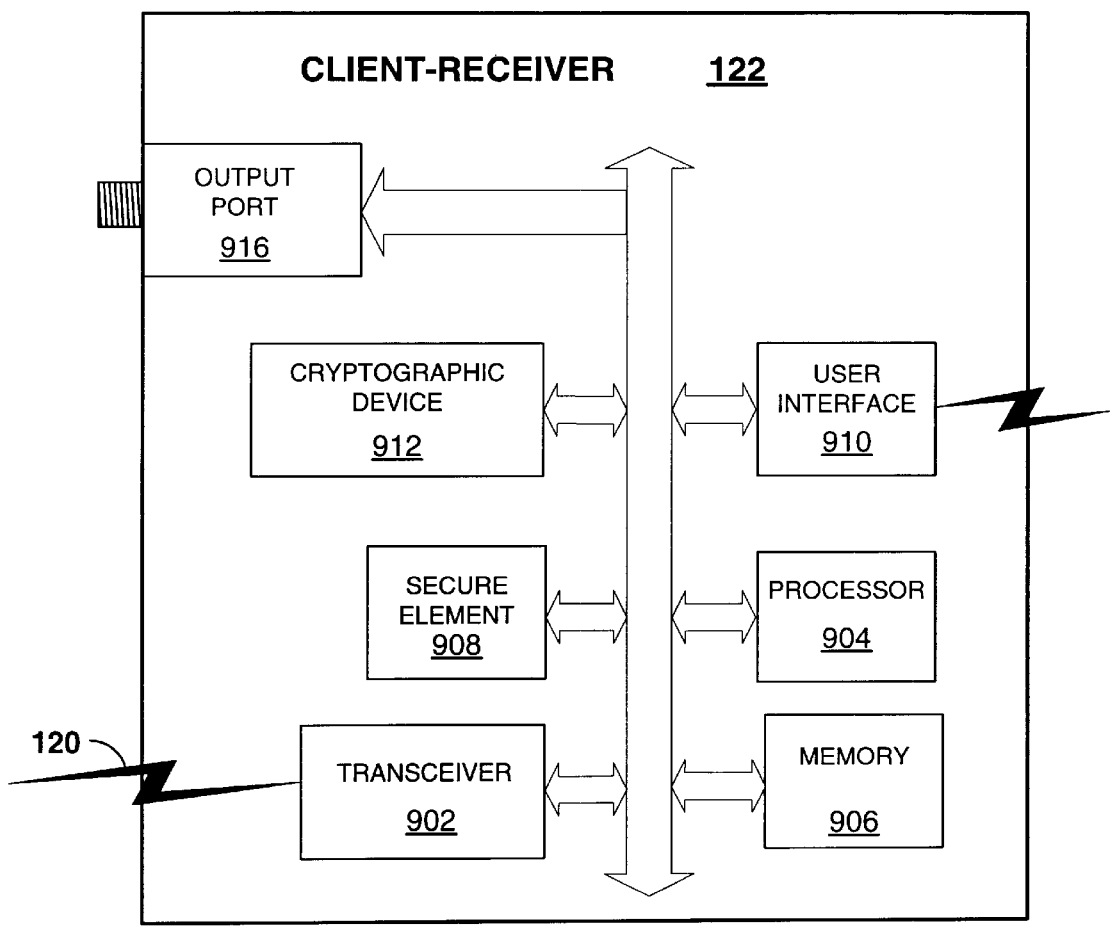
FIG. 9 is a block diagram of a client-receiver.

Referring to FIG. 9, the client-receiver 122 is in two-way communication with the DSCT 110 via communication link 120. The client-receiver 122 is shown as another set-top terminal, though it could also take the form of, among other things, a computer, a smart appliance, personal digital assistants (PDAs), or video cassette recorders (VCRs) and televisions that can receive service instances and other information from the DSCT 110. The client-receiver 122 includes a transceiver 902, a processor 904, a memory 906, a secure element 908, a user interface 910, a cryptographic device 912 and an output port/interface 916. The transceiver 902 receives information such as data, entitlements, authorizations, commands and service instances from the DSCT 110 via communication link 120. The transceiver 902 is adapted to transmit information to the DSCT 110 via communication link 120.

In the preferred embodiment, the client-receiver 122 is adapted to be self-aware and recognize the local network managed by the DSCT 110 when the client-receiver 122 is brought into the local network. The processor 904 and memory 906 include the logic for self-awareness. Non-limiting examples of logic for self-awareness include OSGi, UPnP, HAVi, and JINI, all of which are intended to be in the scope of the invention. The memory 906 includes, among other things, system tables, hardware information, and self-awareness logic. When the client-receiver 122 is introduced into the local network of the DSCT 110, the processor 904 generates a message using the hardware information and self-awareness logic of memory 906. The message is provided to the transceiver 902, where it is sent to the DSCT 110 via communication link 120. The hardware information identifies the type of hardware included in the client-receiver 122 and is used by the DSCT 110 for determining the type of device the DSCT 110 is communicating with. Alternate embodiments include a user interface on the DSCT 110 and the user interface on the client-receiver 122 being used to register the client-receiver 122 and on the client-receiver 122 requesting entitlement information as soon as it is attached to the local network.

The user interface 910 is an infrared detector that receives signals from a remote control device (not shown). In other embodiments, the user interface 910 is a keyboard or keypad or other interface known to those skilled in the art by which the user can provide commands to the client-receiver 122.

The user interface 910 receives commands from the user and provides them to the processor 904 for processing. Using the user interface 910 the user can request services, change user-channels, etc.

When the user requests a service, the processor 904 sends a message to the DSCT via transceiver 902. The message can be addressed to the DSCT 110 or to elements of the headend 102, such as, for example, the entitlement generator 236. Generally, the message is a secure message, which includes an authentication token. In that case, the secure element 908 generates the secure message and provides the secure message to the transceiver 902 for transmission.

In the preferred embodiment, the secure element 908 includes a processor (not shown) and a memory (not shown) that are included in tamper resistant packaging. Among other things, the secure element 908 generates secure messages; processes received EMMs, and generates control words for the cryptographic device 912. The secure element 908 includes entitlements granted to the client-receiver 122, secrets for authenticating messages and generating control words, and keys such as a private key-public key pair of the client receiver 122 and other public keys. The other public keys include trusted public keys, the public key of the conditional access authority 234 and the public key of the DSCT 110.

In the preferred embodiment, when the secure element 908 is produced, the manufacturer assigns it a serial number and its public key-private key pair. The manufacturer provides the serial number and the public key of the secure element 908 to the operator of the DBDS 100, which then includes them in its database 240. When the client-receiver 122 is first brought into the local network of the DSCT 110, it negotiates a communication protocol with the DSCT 110 and sends the DSCT 110 its public key. The DSCT 110 sends a secure message to the CAA 234 informing the CAA 234 that the client-receiver 122 is attempting to register. The CAA 234 determines whether or not the client-receiver 122 is included in its database 240, and if it is, the CAA 234 initiates registration, which can include exchanging one of the trusted public keys of the client-receiver 122 with the public key of the CAA 234. The CAA 234 sends the client-receiver 122 via, the DSCT, an EMM that includes the public key of the DSCT 110, which is then stored in the secure element 908. The client-receiver 122 accepts the public key of the DSCT 110 as a trusted key.

In one embodiment, the secure element 908 is a smart card such as a PC memory card that is user installable into appropriately configured computers. In another embodiment, the secure element is not user installable such as when the client-receiver 122 is a set top terminal.

The processor 904 negotiates an encryption scheme with the DSCT 110 for received service instances. In some situations, the negotiated scheme is no encryption. In that case, the transceiver 902 sends the service instance to the output port 916. In other situations, the service instance is encrypted by the DSCT 110 or at the headend 102, and in that case, the transceiver 902 sends the service instance to the cryptographic device 912 for decryption. The cryptographic device 912 decrypts the service instance using control words provided by the secure element 908 and sends the decrypted service instance to the output port 916. Typically, a user device (not shown) such as a video display or a speaker is coupled to output port 916 for providing the service instance to the user.

Those skilled in the art will recognize that the client-receiver 122 can include more or fewer modules than described hereinabove. For example, in a non-limiting alternative embodiment, the client-receiver 122 does not include a secure element 908. The processor 904 provides the cryptographic device 912 with the control words for decrypting received service instances.

Although exemplary preferred embodiments of the present invention have been shown and described, it will be apparent to those of ordinary skill in the art that a number of changes, modifications, or alterations to the invention as described may be made, none of which depart from the spirit of the present invention. Changes, modifications, and alterations should therefore be seen as within the scope of the present invention. It should also be emphasized that the above-described embodiments of the present invention, particularly, any "preferred embodiments" are merely possible non-limiting examples of implementations, merely setting forth a clear understanding of the principles of the inventions.

What is claimed is:

1. A master-receiver in a subscriber network that receives a service instance from a headend and re-transmits the service instance to a client-receiver, the master-receiver comprising:
   a transceiver adapted to transmit messages and the service instance to the client-receiver and receive a plurality of messages and information therefrom; and
   a processor in communication with the transceiver, adapted to process messages from the client-receiver and dynamically determine an encryption scheme for the service instance transmitted to the client-receiver, wherein the processor is adapted to use at least one message of the plurality of received client-receiver messages to determine the encryption scheme for the service instance,
   wherein the at lest one message includes hardware information of the client-receiver that the processor is adapted to use for dynamically determining the encryption scheme of the transmitted service instance.

2. The master-receiver of claim 1, further including:
   a memory having a client-receiver type table included therein, wherein the processor is adapted to use the client-receiver type table to identify a classification for the client-receiver and is adapted to use the classification in determining the encryption scheme for the service instance.

3. The master-receiver of claim 1, wherein the processor is adapted to use a protocol for secure Internet communication to determine the encryption scheme.

4. The master-receiver of claim 1, further including:
   a cryptographic device adapted to encrypt the service instance.

5. The master-receiver of claim 1, further including:
   a secure element adapted to entitle and disentitle the client-receiver to access service instances.

6. The master-receiver of claim 1, further including:
   a secure element having an entitlement map that associates service instances to entitlements granted to the client-receiver, wherein the master-receiver is adapted to use the entitlement map to determine whether the client-receiver is authorized to receive a service instance.

7. The master-receiver of claim 6, wherein the secure element further includes a second processor and a memory having the private key of private key-public key pair for the receiver, wherein the memory is accessible only to the second processor.

8. The master-receiver of claim 7, wherein the entitlement map is accessible only to the second processor.

9. The master-receiver of claim 1, further including:
   an entitlement manager module adapted to entitle the client-receiver to access the service instance.

10. The master-receiver of claim 9, wherein the entitlement manager module is further adapted to disentitle the client-receiver, wherein prior to disentitlement the client-receiver was entitled to access the service instance and after disentitlement the client-receiver can no longer access the service instance.

11. The master-receiver of claim 9, wherein the entitlement manager module is further adapted to generate a secure message for the client-receiver, and wherein the secure message includes an authentication token that authenticates that the secure message was generated by the master-receiver.

12. The master-receiver of claim 11, wherein the secure message includes content of which at least a portion of the content is used as an input for a hash function to produce a digest, which is signed by a private key of a public key-private key pair of the master-receiver, and the signed digest is the authentication token included in the at least one secure message.

13. The master-receiver of claim 11, further including:
   a port coupled to a communication link coupling the master-receiver to the headend and adapted to receive a secure message addressed to the client-receiver having content included therein, wherein the entitlement manager module authenticates the received secure message and includes the content in the generated secure message.

14. The master-receiver of claim 13, wherein at least a portion of the content of the received secure message includes encrypted content and the entitlement manager module decrypts the encrypted content using the private key of a public key-private key pair of the master-receiver.

15. The master-receiver of claim 1, further including:
   a second transceiver in communication with the headend adapted to transmit messages to the headend and receive messages therefrom; and
   wherein the service instance transmitted to the client-receiver is received in the master-receiver responsive to the master-receiver transmitting a service request message through the second transceiver.

16. The master-receiver of claim 15, wherein the service request message includes a receiver identifier, and the receiver identifier is associated with the master-receiver.

17. The master-receiver of claim 15, wherein the service request message includes a receiver identifier and the receiver identifier is associated with the client-receiver.

18. A method of providing a service instance to a client-receiver in two-way communication with a master-receiver, which is in communication with a headend of a subscriber network system, the method implemented in the master-receiver and comprising the steps of:
   receiving a message from the client-receiver, the message having client-receiver type information included therein;
   dynamically determining an encryption scheme, wherein determining the encryption scheme includes the act of using the client-receiver type information to determine the encryption scheme; and
   determining whether to encrypt the service instance according to the dynamically determined encryption scheme.

19. The method of 18, wherein the step of determining whether to encrypt the service instance includes the steps of:
   determining whether the service instance is encrypted;
   responsive to determining the service instance is encrypted:
      decrypting the service instance, wherein decrypting the service instance includes the act of converting the service instance to an unencrypted service instance; and
      encrypting the unencrypted service instance using the dynamically determined encryption scheme, wherein the step of encrypting the unencrypted service instance includes the act of converting the unencrypted service instance to an encrypted service instance;
   responsive to determining the service instance is not encrypted:
      encrypting the service instance using the dynamically determined encryption scheme, wherein the step of encrypting the service instance includes the act of converting the service instance to an encrypted service instance;
      and further including the step of:
         transmitting the encrypted service instance to the client-receiver.

20. The method of claim 18, further including the steps of:
   generating a secure message for the client-receiver for the service instance; and
   transmitting the secure message to the client-receiver, thereby entitling the client-receiver to access the service instance.

21. The method of claim 18, further including the steps of:
   generating a secure message for the client-receiver for the service instance; and
   transmitting the secure message to the client-receiver, thereby disentitling the client-receiver to access the service instance.

22. The method of claim 18, further including the steps of:
   receiving a message from the client-receiver; and
   responsive to receiving the message, transmitting a service request message to the headend for the service instance, whereby the service instance is received at the master-receiver in response to the transmitted service request message.

23. The method of claim 18, further including the step of:
   checking an entitlement map for the client-receiver to determine whether the client-receiver is entitled to receive the service instance, wherein the entitlement map includes multiple entitlements, each entitlement is either a permission or lack of permission for the client-receiver to receive a particular service instance, and wherein the service instance is only encrypted according to the dynamically determined encryption scheme when the entitlement associated with the service instance is a permission for the client-receiver to receive the service instance.

24. The method of claim 23, further including the steps of:
   receiving an entitlement message from the headend having at least one entitlement for the client-receiver included therein; and
   updating the entitlement map to include the at least one entitlement.

25. The method of claim 23, further including the steps of:
   prior to the step of checking, receiving a message from the client-receiver for the service instance; and
   responsive to determining that the client-receiver is not entitled to receive the service instance, updating the entitlement map to change the state of the entitlement associated with the service instance, whereby after the update, the client-receiver is entitled to receive the service instance.

26. A master-receiver in a subscriber network that receives a service instance from a headend and re-transmits the service instance to a client-receiver, the master-receiver comprising:
   a port adapted to receive the service instance;
   a transceiver adapted to transmit messages and the service instance to the client-receiver and receive a plurality of messages and information therefrom;
   a cryptographic device in communication with the port and the transceiver adapted to encrypt the service instance; and
   a processor in communication with the transceiver and the cryptographic device adapted to process the messages from the client-receiver and adapted to dynamically determine an encryption scheme for the service instance transmitted to the client-receiver, wherein the processor is adapted to use at least one message of the plurality of received client-receiver messages to determine the encryption scheme for the service instance,
   wherein the at least one message includes hardware information of the client-receiver that the processor is adapted to use for dynamically determining the encryption scheme of the transmitted service instance.

27. The master-receiver of claim 26, further including:
   a memory having a client-receiver type table included therein, wherein the processor is adapted to use the client-receiver type table to identify a classification for the client-receiver and is adapted to use the classification in determining the encryption scheme for the service instance.

28. The master-receiver of claim 26, wherein the processor is adapted to use a protocol for secure Internet communication to determine the encryption scheme.

29. The master-receiver of claim 28, wherein the protocol is the Secure Sockets Layer (SSL) protocol.

30. The master-receiver of claim 28, wherein the protocol is the DTCP protocol.

31. The master-receiver of claim 28, wherein the protocol is the Content Protection for Recordable Media (CPRM) protocol.

32. The master-receiver of claim 28, wherein the protocol is the Transport Layer Security (TLS) protocol.

33. The master-receiver of claim 26, wherein the received client-receiver messages include at least one message conforming to the Universal Plug and Play (UPnP) standard.

34. The master-receiver of claim 26, wherein the received client-receiver messages include at least one message conforming to the Jini standard.

35. The master-receiver of claim 26, wherein the received client-receiver messages include at least one message conforming to the Open Service Gateway Initiative standard.

36. The master-receiver of claim 26, further including:
   a secure element having an entitlement manager module adapted to entitle the client-receiver to access the service instance.

37. The master-receiver of claim 36, the entitlement manager module is further adapted to disentitle the client-receiver, wherein prior to disentitlement the client-receiver was entitled to access the service instance and after disentitlement the client-receiver can no longer access the service instance.

38. The master-receiver of claim 36, wherein the entitlement manager module is further adapted to generate a secure message for the client-receiver, and wherein the secure message includes an authentication token that authenticates that the secure message was generated by the master-receiver.

39. The master-receiver of claim 38, wherein the secure message includes content of which at least a portion of the content is used as an input for a hash function to produce a digest that is signed by a private key of a public key-private key pair of the master-receiver, and the signed digest is the authentication token included in the secure message.

40. The master-receiver of claim 38, wherein the port receives a secure message addressed to the client-receiver having content included therein, the entitlement manager module authenticates the received secure message and includes the content in the generated secure message.

41. The master-receiver of claim 40, wherein at least a portion of the content of the received secure message includes encrypted content and the entitlement manager module decrypts the encrypted content using the private key of a public key-private key pair of the master-receiver.

42. The master-receiver of claim 26, further including:
a second transceiver in communication with the port adapted to transmit messages to the headend and receive messages therefrom; and
wherein the service instance transmitted to the client-receiver is received in the master-receiver responsive to the master-receiver transmitting a service request message through the second transceiver.

43. The master-receiver of claim 42, wherein the service request message includes a receiver identifier, and the receiver identifier is associated with the master-receiver.

44. The master-receiver of claim 42, wherein the service request message includes a receiver identifier and the receiver identifier is associated with the client-receiver.

45. The master-receiver of claim 26, wherein the transceiver communicates with the client-receiver through an Ethernet communication link.

46. The master-receiver of claim 26, wherein the transceiver communicates with the client-receiver through a powerline communication link.

47. The master-receiver of claim 26, wherein the transceiver communicates with the client-receiver through a telephone line communication link.

48. The master-receiver of claim 26, wherein the transceiver communicates with the client-receiver through a wireless communication link.

49. The master-receiver of claim 26, wherein the transceiver communicates with the client-receiver through a coaxial cable.

50. A master-receiver in a subscriber network system having a headend in two-way communication with the master-receiver, which is in two-way communication with a client-receiver, wherein the master-receiver receives an encrypted service instance from the headend of the subscriber network and re-transmits the service instance to the client-receiver, the master-receiver comprising:
a port coupled to a communication link coupling the master-receiver to the headend;
a first transceiver coupled to the port adapted to receive entitlement messages from the headend and to transmit messages to the headend;
a second transceiver in communication with the client-receiver adapted to transmit information including the service instance to the client-receiver and receive messages from the client-receiver; and
a processor in communication with the first transceiver and the second transceiver, the processor adapted to determine whether to decrypt the encrypted service instance and re-encrypt the service instance using a dynamically selected encryption scheme, wherein the processor uses at least one message of the received client-receiver messages to dynamically select the encryption scheme, and
a memory having a client-receiver type table stored therein, wherein the processor uses the client-receiver type table and the at least one message to dynamically select the encryption scheme.

51. The master-receiver of claim 50, wherein responsive to a message received at the master-receiver, the processor suspends determining whether to decrypt and re-encrypt the service instance and transmits the service instance to the client-receiver according to parameters established by the headend.

52. The master-receiver of claim 50, wherein responsive to a message received at the master-receiver, the master-receiver suspends transmitting the service instance to the client-receiver.

53. The master-receiver of claim 50, wherein the received client-receiver messages include at least one message conforming to the Universal Plug and Play (UPnP) standard.

54. The master-receiver of claim 50, wherein the received client-receiver messages include at least one message conforming to the Jini standard.

55. The master-receiver of claim 50, wherein the received client-receiver messages include at least one message conforming to the Open Service Gateway Initiative (OSGI) standard.

56. The master-receiver of claim 50, wherein the processor further includes an entitlement management module adapted to generate a secure message that communicates entitlements to the client-receiver for the encrypted service.

57. The master-receiver of claim 56, wherein the of the secure message includes content and an authentication token, which is a digitally signed hash digest of at least a portion of the secure message content, and the entitlement management module generates the hash digest and uses a private key of a public key-private key pair of the master-receiver to digitally sign the hash digest.

58. The master-receiver of claim 56, wherein the entitlement management module uses at least a portion of a shared secret as an input to a hash function to generate a hash digest, and the shared secret is shared between the master-receiver and the client-receiver, and the secure message includes the hash digest as an authentication token.

59. The master-receiver of claim 56, wherein the content of the secure message is encrypted by the entitlement management module using a public key of a public key-private key pair of the client-receiver.

60. The master-receiver of claim 50, wherein a plurality of service instances including the encrypted service instance are received by the port through the communication link, and further including:
a user interface adapted to receive user input for selecting a given service instance of the plurality of service instances;
a plurality of tuners coupled to the port, the plurality of tuners including a first tuner tuned to the encrypted service instance and a second tuner for tuning to the given selected service instance; and a processor coupled to the user interface adapted to selectively tune the second tuner to the given selected service instance.

61. The master-receiver of claim 50, wherein the second transceiver communicates with the client-receiver through an Ethernet communication link.

62. The master-receiver of claim 50, wherein the second transceiver communicates with the client-receiver through a powerline communication link.

63. The master-receiver of claim 50, wherein the second transceiver communicates with the client-receiver through a telephone line communication link.

64. The master-receiver of claim 50, wherein the second transceiver communicates with the client-receiver through a wireless communication link.

65. The master-receiver of claim 50, wherein the second transceiver communicates with the client-receiver through a coaxial cable.

66. A method of providing a service instance to a client-receiver, which is coupled to a master-receiver in a subscriber network having a headend in two-way communication with the master-receiver, the method implemented in the master-receiver and comprising the steps of:

receiving a message from the client-receiver, the message having client-receiver type information included therein, receiving content of a service instance;

dynamically determining an encryption scheme for encrypting the received content of the service instance wherein the client-receiver type information is used to determine the encryption scheme; and determining whether to encrypt the received content of the service instance according to the dynamically determined encryption scheme.

67. The method of claim 66, further including the steps of:

determining whether the received content of the service instance is encrypted; and responsive to both determining the received content of the service instance is not encrypted and determining to not encrypt the received content of the service instance according to the dynamically determined encryption scheme, transmitting the received content of the service instance to the client-receiver.

68. The method of claim 66, further including the steps of:

determining whether the received content of the service instance is encrypted; and responsive to both determining the received content of the service instance is encrypted and determining to not encrypt the received content of the service instance according to the dynamically determined encryption scheme, transmitting the received content of the service instance to the client-receiver.

69. The method of claim 66, further including the steps of:

determining whether the received content of the service instance is encrypted; and responsive to both determining the received content of the service instance is not encrypted and determining to encrypt the received content of the service instance according to the dynamically determined encryption scheme:

encrypting the received content according to the dynamically determined encryption scheme, wherein the step of encrypting the received content includes the act of converting the received content to an encrypted content; and transmitting the encrypted content to the client-receiver.

70. The method of claim 66, further including the steps of:

determining whether the received content of the service instance is encrypted; and responsive to both determining the received content of the service instance is encrypted and determining to encrypt the received content of the service instance according to the dynamically determined encryption scheme:

decrypting the received content of the service instance, wherein the step of decrypting the received content includes the act of converting the received content of the service instance to an unencrypted content;

encrypting the unencrypted content according to the dynamically determined encryption scheme, wherein the step of encrypting the unencrypted content includes the act of converting the unencrypted content to an encrypted content; and transmitting the encrypted content to the client-receiver.

71. The method of claim 66, prior to step receiving content of the service instance, further including the steps of:

generating a secure message for the client-receiver entitling the client-receiver access to the encrypted service instance; and transmitting the secure message to the client-receiver, thereby entitling the client-receiver to access the encrypted service instance.

72. The method of claim 66, prior to step receiving content of the service instance, further including the steps of:

generating a secure message for the client-receiver disentitling the client-receiver access to the encrypted service instance; and transmitting the secure message to the client-receiver, thereby disentitling the client-receiver to access the encrypted service instance.

73. The method of claim 66, prior to step receiving content of the service instance, further including the steps of:

receiving a message from the client-receiver; and responsive to receiving the message, transmitting a service request message to the headend for the service instance, whereby the service instance is received at the master-receiver in response to the transmitted service request message.

\* \* \* \* \*